US012720616B2

(12) United States Patent
Takata et al.

(10) Patent No.: US 12,720,616 B2
(45) Date of Patent: Aug. 25, 2026

(54) COMMUNICATION SYSTEM, CONTROL DEVICE, AND METHOD FOR CONTROLLING COMMUNICATION SYSTEM

(71) Applicant: NEC Corporation, Tokyo (JP)

(72) Inventors: Koya Takata, Tokyo (JP); Hisashi Mizumoto, Tokyo (JP); Atsushi Kamoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 463 days.

(21) Appl. No.: 18/274,367

(22) PCT Filed: Mar. 14, 2022

(86) PCT No.: PCT/JP2022/011255
§ 371 (c)(1),
(2) Date: Jul. 26, 2023

(87) PCT Pub. No.: WO2022/209814
PCT Pub. Date: Oct. 6, 2022

(65) Prior Publication Data

US 2024/0098807 A1 Mar. 21, 2024

(30) Foreign Application Priority Data

Mar. 31, 2021 (JP) ................................ 2021-061077

(51) Int. Cl.
*H04W 76/10* (2018.01)
*H04W 84/18* (2009.01)

(52) U.S. Cl.
CPC ............ *H04W 76/10* (2018.02); *H04W 84/18* (2013.01)

(58) Field of Classification Search
CPC ..... H04W 76/10; H04W 84/18; H04W 24/04; H04W 40/34; H04W 88/02; H04W 2/12;
(Continued)

(56) References Cited

U.S. PATENT DOCUMENTS

| | | | |
|---|---|---|---|
| 7,099,589 | B1 | 8/2006 | Hiramatsu |
| 10,349,336 | B1 | 7/2019 | Choi |

(Continued)

FOREIGN PATENT DOCUMENTS

| | | | |
|---|---|---|---|
| JP | H10-150401 | A | 6/1998 |
| JP | 2002-529017 | A | 9/2002 |

(Continued)

OTHER PUBLICATIONS

"Consistency-Aware Weather Disruption-Tolerant Routing in SDN-Based Wireless Mesh Networks" by Forough Yaghoubi et al. IEEE Transactions on Network and Service Management, vol. 15, No. 2, Jun. 2018 (Year: 2018).*

(Continued)

*Primary Examiner* — Charles C Jiang
*Assistant Examiner* — Margaret Marie Anderson
(74) *Attorney, Agent, or Firm* — Sughrue Mion, PLLC

(57) ABSTRACT

A communication system (1) includes a plurality of communication apparatuses (10) and a control apparatus (20), the control apparatus (20) including a control unit (21), the control unit (21) including: an acquisition unit (22) that acquires related information related to the communication apparatuses (10) and reference information; and an accumulation unit (23) that calculates correlation between the related information and the reference information, and accumulates correlation information indicative of the calculated correlation.

6 Claims, 18 Drawing Sheets

(58) Field of Classification Search
CPC ..... H04W 72/40; H04W 72/50; H04W 72/51; H04W 72/512
See application file for complete search history.

(56) References Cited

U.S. PATENT DOCUMENTS

| | | | | |
|---|---|---|---|---|
| 2008/0215609 | A1* | 9/2008 | Cleveland | G06F 16/24556 707/999.102 |
| 2013/0272701 | A1 | 10/2013 | Kuri | |
| 2015/0373618 | A1 | 12/2015 | Deenoo | |
| 2016/0255423 | A1 | 9/2016 | Suzuki et al. | |
| 2018/0110040 | A1* | 4/2018 | Chamarti | H04B 10/25753 |
| 2021/0058815 | A1 | 2/2021 | Hodroj et al. | |

FOREIGN PATENT DOCUMENTS

| | | | |
|---|---|---|---|
| JP | 2003-069616 | A | 3/2003 |
| JP | 2004-128709 | A | 4/2004 |
| JP | 3638192 | B2 | 4/2005 |
| JP | 3661912 | B2 | 6/2005 |
| JP | 3744362 | B2 | 2/2006 |
| JP | 2007-110373 | A | 4/2007 |
| JP | 2007-174368 | A | 7/2007 |
| JP | 3969562 | B2 | 9/2007 |
| JP | 2008-022219 | A | 1/2008 |
| JP | 2009-159113 | A | 7/2009 |
| JP | 2009-218913 | A | 9/2009 |
| JP | 2009-225172 | A | 10/2009 |
| JP | 2010-511323 | A | 4/2010 |
| JP | 2011-009974 | A | 1/2011 |
| JP | 2012-134641 | A | 7/2012 |
| JP | 2014-531852 | A | 11/2014 |
| JP | 2014-233065 | A | 12/2014 |
| JP | 2016-511585 | A | 4/2016 |
| JP | 2016-523036 | A | 8/2016 |
| JP | 2016-174361 | A | 9/2016 |
| JP | 2016-201663 | A | 12/2016 |
| JP | 2017-212714 | A | 11/2017 |
| JP | 2018-157461 | A | 10/2018 |
| JP | 2019-016839 | A | 1/2019 |
| JP | 2019-161372 | A | 9/2019 |
| JP | 2019-161373 | A | 9/2019 |
| JP | 2019-169781 | A | 10/2019 |
| JP | 6653684 | B2 | 2/2020 |
| JP | 6739807 | B2 | 8/2020 |
| JP | 2020-530968 | A | 10/2020 |
| JP | 2021-508218 | A | 2/2021 |
| WO | 2011/121671 | A1 | 10/2011 |
| WO | 2012/131854 | A1 | 10/2012 |
| WO | 2015/072022 | A1 | 5/2015 |
| WO | 2016/199524 | A1 | 12/2016 |
| WO | 2019/097891 | A1 | 5/2019 |
| WO | 2019/229557 | A1 | 12/2019 |

OTHER PUBLICATIONS

U.S. Appl. No. 18/274,419, filed Mar. 14, 2022 U.S. National Phase Entry Date: Jul. 26, 2023 First-Named Inventor: Koya Takata.
U.S. Appl. No. 18/274,361, filed Mar. 14, 2022 U.S. National Phase Entry Date: Jul. 26, 2023 First-Named Inventor: Koya Takata.
U.S. Appl. No. 18/274,377, filed Mar. 14, 2022 U.S. National Phase Entry Date: Jul. 26, 2023 First-Named Inventor: Koya Takata.
U.S. Appl. No. 18/274,373, filed Mar. 14, 2022 U.S. National Phase Entry Date: Jul. 26, 2023 First-Named Inventor: Koya Takata.
U.S. Appl. No. 18/274,404, filed Mar. 14, 2022 U.S. National Phase Entry Date: Jul. 26, 2023 First-Named Inventor: Koya Takata.
U.S. Appl. No. 18/274,315, filed Mar. 14, 2022 U.S. National Phase Entry Date: Jul. 26, 2023 First-Named Inventor: Koya Takata.
U.S. Appl. No. 18/274,446, filed Mar. 14, 2022 U.S. National Phase Entry Date: Jul. 26, 2023 First-Named Inventor: Koya Takata.
U.S. Appl. No. 18/274,398, filed Mar. 14, 2022 U.S. National Phase Entry Date: Jul. 26, 2023 First-Named Inventor: Koya Takata.
International Search Report for PCT Application No. PCT/JP2022/011255, mailed on Jun. 14, 2022.
International Search Report for PCT Application No. PCT/JP2022/011188, mailed on Jun. 7, 2022.
International Search Report for PCT Application No. PCT/JP2022/011174, mailed on Jun. 14, 2022.
International Search Report for PCT Application No. PCT/JP2022/011176, mailed on Jun. 14, 2022.
International Search Report for PCT Application No. PCT/JP2022/011177, mailed on Jun. 7, 2022.
International Search Report for PCT Application No. PCT/JP2022/011189, mailed on May 31, 2022.
International Search Report for PCT Application No. PCT/JP2022/011191, mailed on May 31, 2022.
International Search Report for PCT Application No. PCT/JP2022/011192, mailed on May 24, 2022.
International Search Report for PCT Application No. PCT/JP2022/011193, mailed on May 31, 2022.
JP Office Communication for JP Application No. 2023-510863, mailed on Aug. 6, 2024 with English Translation.
JP Office Communication for JP Application No. 2023-510867, mailed on Feb. 25, 2025 with English Translation.

* cited by examiner

COMMUNICATION SYSTEM, CONTROL DEVICE, AND METHOD FOR CONTROLLING COMMUNICATION SYSTEM

This application is a National Stage Entry of PCT/JP2022/011255 filed on Mar. 14, 2022, which claims priority from JP Patent Application 2021-061077 filed on Mar. 31, 2021, the contents of all of which are incorporated herein by reference, in their entirety.

TECHNICAL FIELD

The present invention relates to a communication system for a meshed network in which a directional communication medium is used to carry out communication, a control apparatus, and a method for controlling a communication system.

BACKGROUND ART

Communication technologies that make it possible to achieve large capacity and low delay are required in the field of communication networks. As one of such communication technologies, a communication technology is being developed in which a directional communication medium such as millimeter wave or visible light band light is used. A system is also being developed in which a control apparatus controls a plurality of communication terminals forming a communication network. For example, Patent Literature 1 discloses an optical access system in which a control apparatus controls a network formed by a plurality of central offices that are connected through an optical path. Patent Literature 2 discloses a wireless communication system in which a hopping node, which is a communication apparatus that carries out millimeter wave wireless communication, connects to a connection destination in accordance with information pertaining to the connection destination, the information being notified by a communication management apparatus that manages the hopping node.

CITATION LIST

Patent Literature

[Patent Literature 1]
Japanese Patent Application Publication Tokukai No. 2012-134641
[Patent Literature 2]
Japanese Patent Application Publication Tokukai No. 2019-161372

SUMMARY OF INVENTION

Technical Problem

A directional communication medium has the following aspects. Specifically, the directional communication medium, which has a large frequency, can be expected to achieve large-capacity and low-delay communication. In contrast, the directional communication medium is susceptible to influence such as shielding and/or disturbance due to its directionality.

In order to ensure robustness of communication while using a directional communication medium, a configuration is preferable that makes it possible to make adaptive changes including node subscription to a network and a change in node position. However, even use of the techniques disclosed in Patent Literatures 1 and 2 is insufficient to achieve such a configuration.

An example aspect of the present invention has been made in view of the above problems, and an example object thereof is to provide a technique for achieving a robust communication network in which a directional communication medium is used.

Solution to Problem

A communication system according to an example aspect of the present invention includes a plurality of communication apparatuses that are capable of configuring a meshed network, and a control apparatus that controls the plurality of communication apparatuses, the plurality of communication apparatuses each including: at least one communication unit that is configured to be capable of transmitting and receiving directional communication media; and at least one first processor, the at least one first processor carrying out: a specification process for specifying at least one connection destination candidate by carrying out scanning with use of the at least one communication unit; and a connection establishment process for establishing connection with the at least one connection destination candidate specified by the specification process, the control apparatus including at least one second processor, the at least one second processor carrying out: a control process for controlling the plurality of communication apparatuses, in the control process, the at least one second processor carrying out: an acquisition process for acquiring, from at least one communication apparatus included in the meshed network, not only related information related to the at least one communication apparatus but also reference information different from the related information; and an accumulation process for calculating correlation between the related information and the reference information, and accumulating correlation information indicative of the calculated correlation.

A control apparatus according to an example aspect of the present invention includes at least one second processor, the at least one second processor carrying out a control process for controlling a plurality of communication apparatuses that are capable of configuring a meshed network, the plurality of communication apparatuses each including: at least one communication unit that is configured to be capable of transmitting and receiving directional communication media; and at least one first processor, the at least one first processor carrying out: a specification process for specifying at least one connection destination candidate by carrying out scanning with use of the at least one communication unit; and a connection establishment process for establishing connection with the at least one connection destination candidate specified by the specification process, in the control process, the at least one second processor carrying out: an acquisition process for acquiring, from at least one communication apparatus included in the meshed network, not only related information related to the at least one communication apparatus but also reference information different from the related information; and an accumulation process for calculating correlation between the related information and the reference information, and accumulating correlation information indicative of the calculated correlation.

A method for controlling a communication system according to an example aspect of the present invention is a method for controlling a communication system including a plurality of communication apparatuses that are capable of configuring a meshed network, and a control apparatus that controls the plurality of communication apparatuses, the method including: the plurality of communication apparatuses each (i) specifying at least one connection destination candidate by carrying out scanning with use of at least one communication unit that is configured to be capable of transmitting and receiving directional communication media, and (ii) establishing connection with the at least one connection destination candidate thus specified; and the control apparatus controlling the plurality of communication apparatuses, wherein the control apparatus controlling the plurality of communication apparatuses includes the control apparatus (a) acquiring, from at least one communication apparatus included in the meshed network, not only related information related to the at least one communication apparatus but also reference information different from the related information, and (b) calculating correlation between the related information and the reference information, and accumulating correlation information indicative of the calculated correlation.

Advantageous Effects of Invention

An example aspect of the present invention makes it possible to achieve a robust communication network in which a directional communication medium is used.

EXAMPLE EMBODIMENTS

First Example Embodiment

A first example embodiment of the present invention will be described in detail with reference to the drawings. The first example embodiment is an embodiment serving as a basis for example embodiments described later.

(Configuration of Communication System 1)

Figure 1:
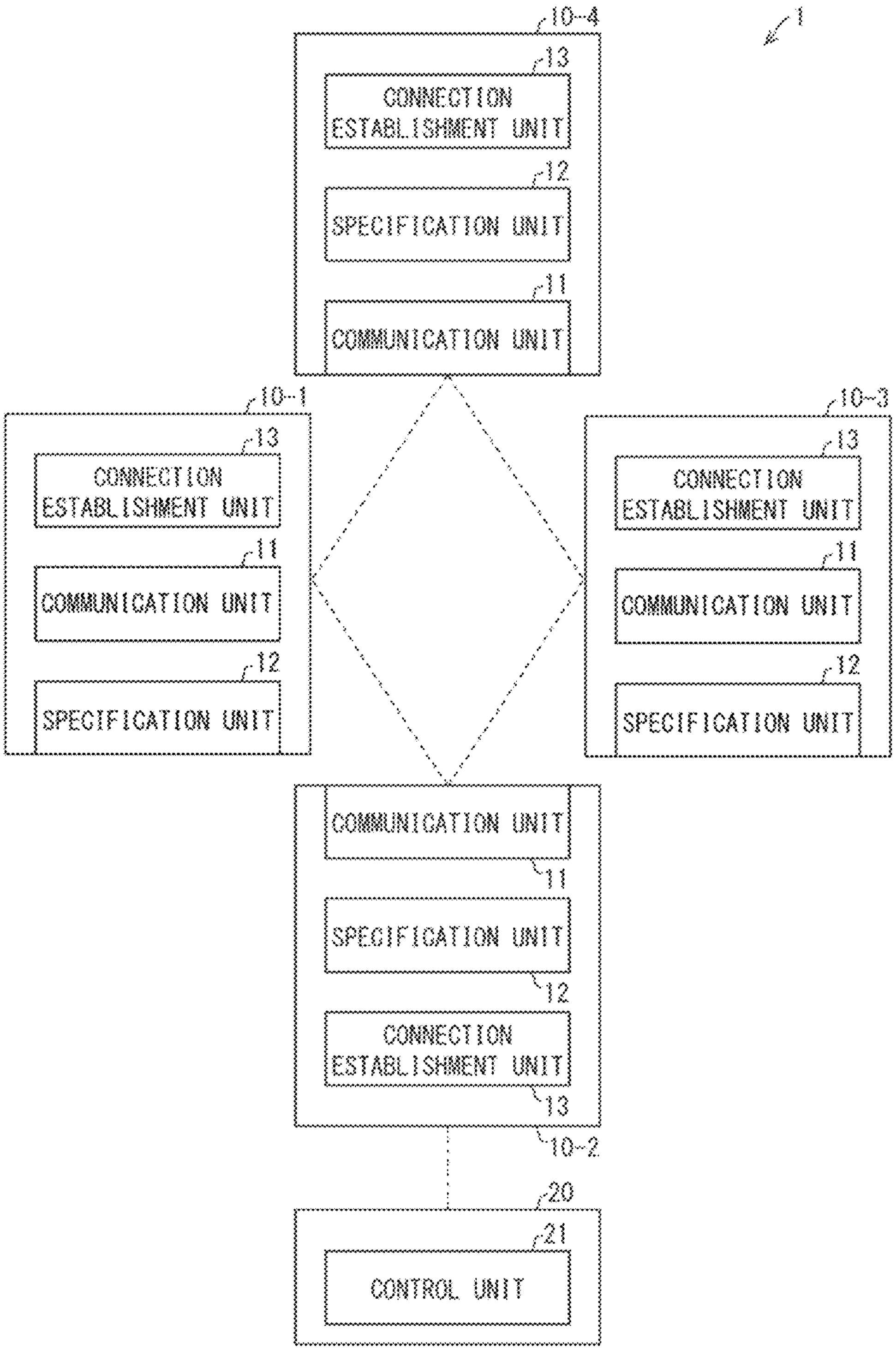
FIG. 1 is a block diagram illustrating a configuration of a communication system according to a first example embodiment of the present invention.

A configuration of a communication system 1 according to the first example embodiment will be described with reference to FIG. 1. FIG. 1 is a block diagram illustrating the configuration of the communication system 1. The communication system 1 according to the first example embodiment includes a plurality of communication apparatuses 10 and a control apparatus 20 as illustrated in FIG. 1.

The plurality of communication apparatuses 10 are capable of configuring a meshed network. For example, the meshed network includes a first communication apparatus 10-1, a second communication apparatus 10-2, a third communication apparatus 10-3, and a fourth communication apparatus 10-4 as illustrated in FIG. 1. The meshed network is constituted by these communication apparatuses connecting to each other. Note that the example configuration illustrated in FIG. 1 is merely an example. The communication system 1 may be configured to include five or more communication apparatuses, or may be configured to include three or less communication apparatuses. The first communication apparatus 10-1, the second communication apparatus 10-2, the third communication apparatus 10-3, and the fourth communication apparatus 10-4, which are illustrated in FIG. 1, have similar configurations. Thus, in the following description, a single communication apparatus will be taken up to be discussed as a communication apparatus 10.

(Communication Apparatus 10)

The communication apparatus 10 includes a communication unit 11, a specification unit 12, and a connection establishment unit 13 as illustrated in FIG. 1. The communication unit 11, the specification unit 12, and the connection establishment unit 13 are an example implementation of a communication means, a specification means, and a connection establishment means, respectively.

The communication unit 11 is configured to be capable of transmitting and receiving directional communication media. The number of communication units 11 included in the communication apparatus 10 does not limit the first example embodiment. The communication apparatus 10 can be configured to include at least one communication unit 11.

As described above, each of the at least one communication unit 11 is configured to be capable of transmitting and receiving directional communication media. Note here that a specific configuration of a communication unit 11 does not limit the first example embodiment. For example, the communication unit 11 includes a transmission unit that transmits a directional communication medium, and a reception unit that receives a directional communication medium. The communication unit 11 may be configured to include an integrated transmission and reception unit that transmits and receives directional communication media.

A specific example of a directional communication medium that the communication unit 11 uses for communication does not limit the first example embodiment. For example, such a directional communication medium can be exemplified by high frequency domain electromagnetic waves having a frequency of approximately 10 GHz or more. The high frequency domain electromagnetic waves may include millimeter waves, submillimeter waves, infrared light, visible light, and ultraviolet light.

For example, the communication unit 11 uses the high frequency domain electromagnetic waves as the directional communication medium (described earlier) for communication by directing and transmitting the high frequency domain electromagnetic waves into a predetermined range of angles. Note here that a specific configuration that allows the communication unit 11 to direct the high frequency domain electromagnetic waves does not limit the first example embodiment. For example, the communication unit 11 can be configured to include, for example, the following:

- a beamforming antenna for directing and transmitting millimeter waves or submillimeter waves into a predetermined range of angles;
- a collimator for collimating infrared light, visible light, or ultraviolet light; and
- a laser oscillator for generating a laser of infrared light, visible light, or ultraviolet light.

In a case where the communication unit 11 directs and transmits the high frequency domain electromagnetic waves serving as the communication medium, the communication medium has higher energy density. This enables communication with a more distant communication destination with use of the communication medium.

(Specification Unit 12)

The specification unit 12 specifies at least one connection destination candidate by scanning with use of the communication unit 11. In other words, the specification unit 12 specifies at least one connection destination candidate by transmission or reception of a scanning beam with use of the communication unit 11.

Note here that scanning with use of the directional communication medium (described earlier) is carried out in scanning with use of the communication unit 11. Scanning in the first example embodiment refers to, for example, a search that is carried out to specify at least one connection destination candidate. The wording "scanning" does not attempt to specify, for example, a specific scanning order.

Furthermore, scanning by the specification unit 12 with use of the communication unit 11 includes at least one selected from the group consisting of the following:

- transmitting a scanning beam from the communication unit 11 to a scanning range;
- transmitting a scanning beam from the communication unit 11 to a scanning range and receiving a response beam that is a response to the scanning beam;
- the communication unit 11 receiving a scanning beam transmitted from another apparatus; and
- the communication unit 11 receiving a scanning beam transmitted from another apparatus, and transmitting a response beam that is a response to the scanning beam.

Scanning by the specification unit 12 includes, for example, a search for a connection destination candidate whose position is not made clear in advance. More specifically, for example, scanning by the specification unit 12 includes a search for a connection destination candidate for which a direction starting from the communication apparatus 10 is not made clear in advance. In other words, scanning by the specification unit 12 includes a search for a connection destination candidate for which at least one selected from the group consisting of an azimuth angle, an elevation angle, and a depression angle each starting from the communication apparatus 10 is not made clear in advance.

In a case where at least one connection destination candidate whose position is not made clear in advance as described above is searched for, the specification unit 12 specifies the position of the at least one connection destination candidate by scanning with use of the communication unit 11. More specifically, for example, the specification unit 12 uses scanning with use of the communication unit 11 to specify, for the at least one connection destination candidate, the direction starting from the communication apparatus 10. In other words, the specification unit 12 uses scanning with use of the communication unit 11 to specify, for the at least one connection destination candidate, at least one selected from the group consisting of the azimuth angle, the elevation angle, and the depression angle each starting from the communication apparatus 10.

The at least one connection destination candidate that is specified by the specification unit 12 is not limited to a communication apparatus included in a scanning range of scanning with use of the communication unit 11. With reference to a response signal from the communication apparatus included in the scanning range of scanning with use of the communication unit 11, the specification unit 12 can also specify, as a connection destination candidate, a communication apparatus that is specified by the response signal and that is outside the scanning range.

For example, with reference to a response signal from a communication apparatus A included in the scanning range of scanning with use of the communication unit 11, the specification unit 12 can also specify, as a connection destination candidate, a communication apparatus B whose position is specified by the response signal and that is outside the scanning range.

(Connection Establishment Unit 13)

The connection establishment unit 13 establishes connection with the at least one connection destination candidate specified by the specification unit 12. Note here that the connection establishment unit 13 may establish the connection with use of a communication unit that is identical to the at least one communication unit 11 which is included in the communication apparatus 10 and which has been used by the specification unit 12 for scanning, or a communication unit that is partially or entirely different from the at least one communication unit 11 which has been used by the specification unit 12 for scanning.

In any case, the connection establishment unit 13 causes the at least one communication unit 11 included in the communication apparatus 10 to use a directional communication medium to establish connection with the at least one connection destination candidate specified by the specification unit 12.

A process in which the connection is specifically established by the connection establishment unit 13 does not limit the first example embodiment. The process includes, for example, the following process A.

(Process A): A process in which the communication unit 11 of the communication apparatus 10 transmits a directional communication medium to the connection destination candidate specified by the specification unit 12

The process in which the connection is established may be configured to include not only the process A but also the following process B.

(Process B): A process in which as a response to transmission in the process A, a connection destination candidate transmits a directional communication medium to the communication apparatus 10, and the communication unit 11 of the communication apparatus 10 receives the directional communication medium In the process A, the communication unit 11 of the communication apparatus 10 may be configured to use the directional communication medium to transmit, to the connection destination candidate, connection start information for connection start in accordance with a specific protocol. Alternatively, in the process B, the communication unit 11 of the communication apparatus 10 may be configured to use the directional communication medium to receive, from the connection destination candidate, connection acceptance information in accordance with the specific protocol.

The connection start information may be configured to include identification information for identifying the communication apparatus 10 from another apparatus. The connection acceptance information may be configured to include identification information for identifying the connection destination candidate from another apparatus.

Furthermore, the process in which the connection is established may be configured to include not only the processes A and B but also the following processes C and D.

(Process C): A process in which the connection destination candidate refers to the connection start information that the communication unit 11 of the communication apparatus 10 has transmitted by the directional communication medium in the process A, and the connection destination candidate registers identification information of the communication apparatus 10 in a storage unit included in the connection destination candidate (Process D): A process in which the communication apparatus 10 refers to the connection acceptance information that the communication unit 11 of the communication apparatus 10 has received by the directional communication medium in the process B, and registers identification information of the connection destination candidate in a storage unit included in the communication apparatus 10

Furthermore, the process in which the connection is established may be configured to include not only the processes A, B, C, and D but also at least one of the following processes E and F.

(Process E): A process in which the identification information of the communication apparatus 10, the identification information having been registered by the connection destination candidate in the process C, is transmitted to the control apparatus 20

(Process F): A process in which the identification information of the connection destination candidate, the identification information having been registered by the communication apparatus 10 in the process D, is transmitted to the control apparatus 20

(Control Apparatus 20)

The control apparatus 20 controls the plurality of communication apparatuses 10.

The control apparatus 20 controls the plurality of communication apparatuses 10 by, for example, exchange of, for example, signals, information, and/or instructions between the control apparatus 20 and the communication apparatus 10 via a wired or wireless local area network or a global network, or a combination thereof. These networks may include the meshed network of the communication system 1.

Though not limiting the first example embodiment, in the example illustrated in FIG. 1, the control apparatus 20 connects to the meshed network via the second communication apparatus 10-2 and controls the plurality of communication apparatuses 10 via the meshed network. The control apparatus 20 may not only control the plurality of communication apparatuses 10 via the meshed network but also control the plurality of communication apparatuses 10 via another communication path.

The control apparatus 20 includes a control unit 21 as illustrated in FIG. 1. The control unit 21 is an example implementation of a control means.

(Control Unit 21)

The control unit 21 controls the plurality of communication apparatuses 10.

For example, the control unit 21 refers to the information described earlier and managed by the control unit 21, and carries out, for example, the following:

- monitoring of each of the communication apparatuses 10 (especially, a boundary terminal);
- control of line connection between the communication apparatuses 10; and
- updating of a communication path (including updating of priority of the communication path).

Though not limiting the first example embodiment, an objective of control of the plurality of communication apparatuses 10 is exemplified by the following:

- support for connection of a new communication apparatus 10 to a meshed network;
- reconnection of disconnected lines; and
- updating of a communication path for preventing line communication quality deterioration or line disconnection.

Though not limiting the first example embodiment, for example, the control unit 21 controls the plurality of communication apparatuses 10 in accordance with the following pieces of information:

- a network state related to a backbone link and an access link;
- related information pertaining to each of the communication apparatuses 10 (positional information, a load state, the number of established connections, the number of specified connection destination candidates, a connection state of connection in which each of the communication apparatuses 10 is involved, etc.); and reference information (weather information, sensor information, etc.).

The control unit 21 may acquire these pieces of information from, for example, each of the communication apparatuses 10 or an external apparatus (not illustrated).

Note here that the access link mainly refers to a connection path for use in data exchange between edge terminals included in the communication system 1. Note also that the backbone link mainly refers to a connection path for use in data exchange between communication apparatuses included in the communication system 1 and different from an edge terminal. Even the backbone link sometimes functions as the access link depending on a situation.

Though not limiting the first example embodiment, for example, the control unit 21 controls the plurality of communication apparatuses 10 at the following timings:

a timing at which the new communication apparatus 10 carries out scanning for connection to the meshed network;

a timing at which a state of connection between the communication apparatuses 10 in the meshed network is changed; and a timing at which line quality deterioration or line disconnection between the communication apparatuses 10 in the meshed network is predicted.

The control unit 21 may detect these timings by, for example, monitoring each of the communication apparatuses 10. The control unit 21 may also control the plurality of communication apparatuses 10 in accordance with a monitoring result for each of the communication apparatuses 10 at any time rather than a specific timing.

(Effect Brought about by Communication System 1)

As described above, the communication system 1 includes a plurality of communication apparatuses (for example, the first communication apparatus 10-1, the second communication apparatus 10-2, the third communication apparatus 10-3, and the fourth communication apparatus) and the control apparatus 20. A configuration is employed such that the communication apparatuses 10 each include:

the at least one communication unit 11 that is configured to be capable of transmitting and receiving directional communication media;

the specification unit 12 that specifies at least one connection destination candidate by carrying out scanning with use of the at least one communication unit 11; and the connection establishment unit 13 that establishes connection with the at least one connection destination candidate specified by the specification unit 12, the control apparatus 20 including the control unit 21 that controls a meshed network composed of the plurality of communication apparatuses 10 connecting to each other.

The communication system 1 configured as described above enables each of the communication apparatuses 10 to specify, by carrying out scanning with use of the communication unit 11, even a connection destination candidate whose position is not made clear in advance. Thus, it is possible to establish communication with the specified connection destination candidate.

A directional communication medium commonly has the following aspects. Specifically, the directional communication medium makes it possible to achieve large-capacity and low-delay communication. In contrast, the directional communication medium is susceptible to influence such as shielding and/or disturbance due to its directionality. The communication apparatus 10 according to the first example embodiment makes it possible to make, in a network in which a directional communication medium is used, adaptive changes including addition of a communication apparatus and a change in position. This makes it possible to configure a network that is less susceptible to influence such as shielding and/or disturbance.

The control apparatus 20 can also improve network stability by controlling the plurality of communication apparatuses 10.

That is, the communication system 1 according to the first example embodiment makes it possible to achieve a robust communication network in which a directional communication medium is used.

(Effect Brought about by Control Apparatus 20)

A configuration is employed such that the control apparatus 20 according to the first example embodiment controls a plurality of communication apparatuses 10 that are capable of configuring a meshed network, the plurality of communication apparatuses each including: at least one communication means that is configured to be capable of transmitting and receiving directional communication media; a specification means that specifies at least one connection destination candidate by carrying out scanning with use of the at least one communication means; and a connection establishment means that establishes connection with the at least one connection destination candidate specified by the specification means, the control apparatus including a control means that controls the plurality of communication apparatuses.

The control apparatus 20 configured as described above controls the plurality of communication apparatuses 10 that are capable of configuring a meshed network. The plurality of communication apparatuses 10 each can specify, by carrying out scanning with use of the communication unit 11, even a connection destination candidate whose position is not made clear in advance. The plurality of communication apparatuses each can establish communication with the specified connection destination candidate. The control apparatus 20 can improve stability of a meshed network by thus controlling the plurality of communication apparatuses 10.

Thus, as in the case of the communication system 1 according to the first example embodiment, the control apparatus 20 according to the first example embodiment makes it possible to achieve a robust communication network in which a directional communication medium is used.

(Method for Controlling Communication System 1)

Figure 2:
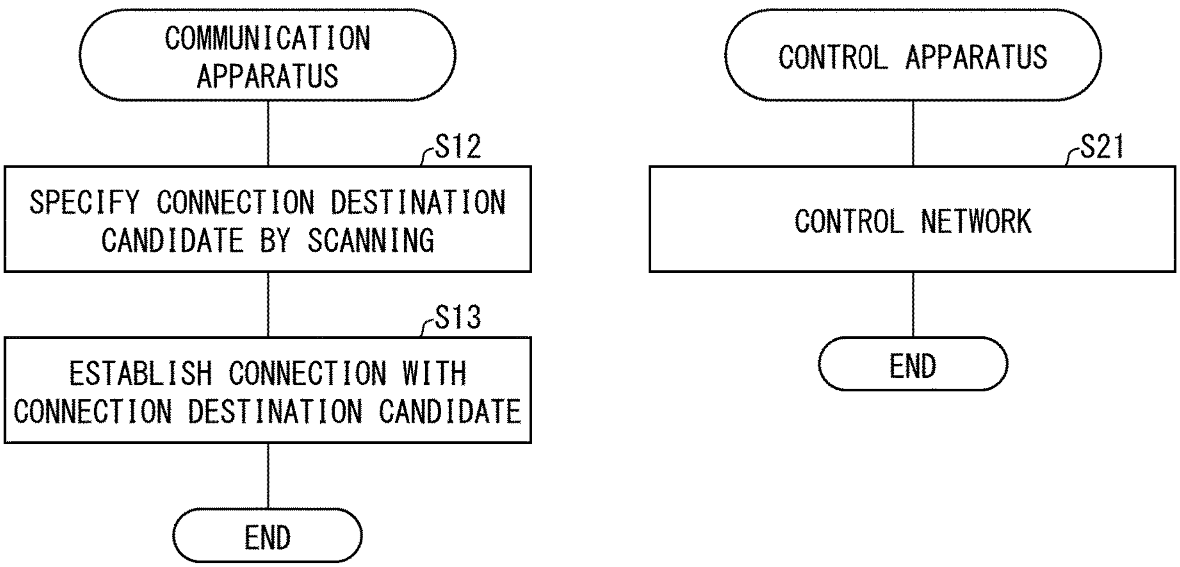
FIG. 2 is a flowchart illustrating a flow of a communication method according to the first example embodiment of the present invention.

A method for controlling the communication system 1 according to the first example embodiment will be described with reference to FIG. 2. FIG. 2 is a flowchart illustrating the method for controlling the communication system 1 according to the first example embodiment. As illustrated in FIG. 2, the method for controlling the communication system 1 includes steps S12 and S13 carried out by the communication apparatus 10, and a step S21 carried out by the control apparatus 20. As described above, the communication system 1 includes the plurality of communication apparatuses 10 that are capable of configuring a meshed network, and the control apparatus 20 that controls the plurality of communication apparatuses 10.

(Step S12)

First, in the step S12, the specification unit 12 specifies at least one connection destination candidate by carrying out scanning with use of the communication unit 11. Note here that scanning with use of the directional communication medium (described earlier) is carried out in scanning with use of the communication unit 11. Since specific details of the process carried out by the specification unit 12 have been described earlier, a description thereof is omitted here.

(Step S13)

Subsequently, in the step S13, the connection establishment unit 13 establishes connection with the at least one connection destination candidate specified by the specification unit 12. Note here that the connection establishment unit 13 may establish the connection with use of a communication unit that is identical to the at least one communication unit 11 which is included in the communication apparatus 10 and which has been used by the specification unit 12 for scanning, or a communication unit that is partially or entirely different from the at least one communication unit 11 which has been used by the specification unit 12 for scanning. Since specific details of the process carried out by the connection establishment unit 13 have been described earlier, a description thereof is omitted here.

(Step S21)

The step S21 is carried out before/after the steps S12 and S13, or simultaneously with the steps S12 and S13. In the step S21, the control unit 21 controls the plurality of communication apparatuses 10. Since specific details of the process carried out by the control unit 21 have been described earlier, a description thereof is omitted here.

(Effect Brought about by Method for Controlling Communication System 1)

As described above, the method for controlling the communication system 1 according to the first example embodiment includes: the plurality of communication apparatuses 10 each (i) specifying at least one connection destination candidate by carrying out scanning with use of a directional communication medium (S12), and (ii) establishing connection with the at least one connection destination candidate thus specified (S13); and the control apparatus 20 controlling the plurality of communication apparatuses 10 (S21).

The method for controlling the communication system 1 configured as described above enables each of the plurality of communication apparatuses 10 to specify, by carrying out scanning with use of the communication unit 11, even a connection destination candidate whose position is not made clear in advance. The method for controlling the communication system 1 enables each of the plurality of communication apparatuses 10 to establish communication with the specified connection destination candidate. The method for controlling the communication system 1 enables the control apparatus 20 to improve stability of a meshed network by controlling the plurality of communication apparatuses 10.

Thus, as in the case of the communication system 1 according to the first example embodiment, the method for controlling the communication system 1 according to the first example embodiment makes it possible to achieve a robust communication network in which a directional communication medium is used.

Second Example Embodiment

A second example embodiment of the present invention will be described in detail with reference to the drawings. Note that members having functions identical to those of the respective members described in the first example embodiment are given respective identical reference numerals, and a description of those members is omitted as appropriate.

(Configuration of Communication System 1)

Figure 3:
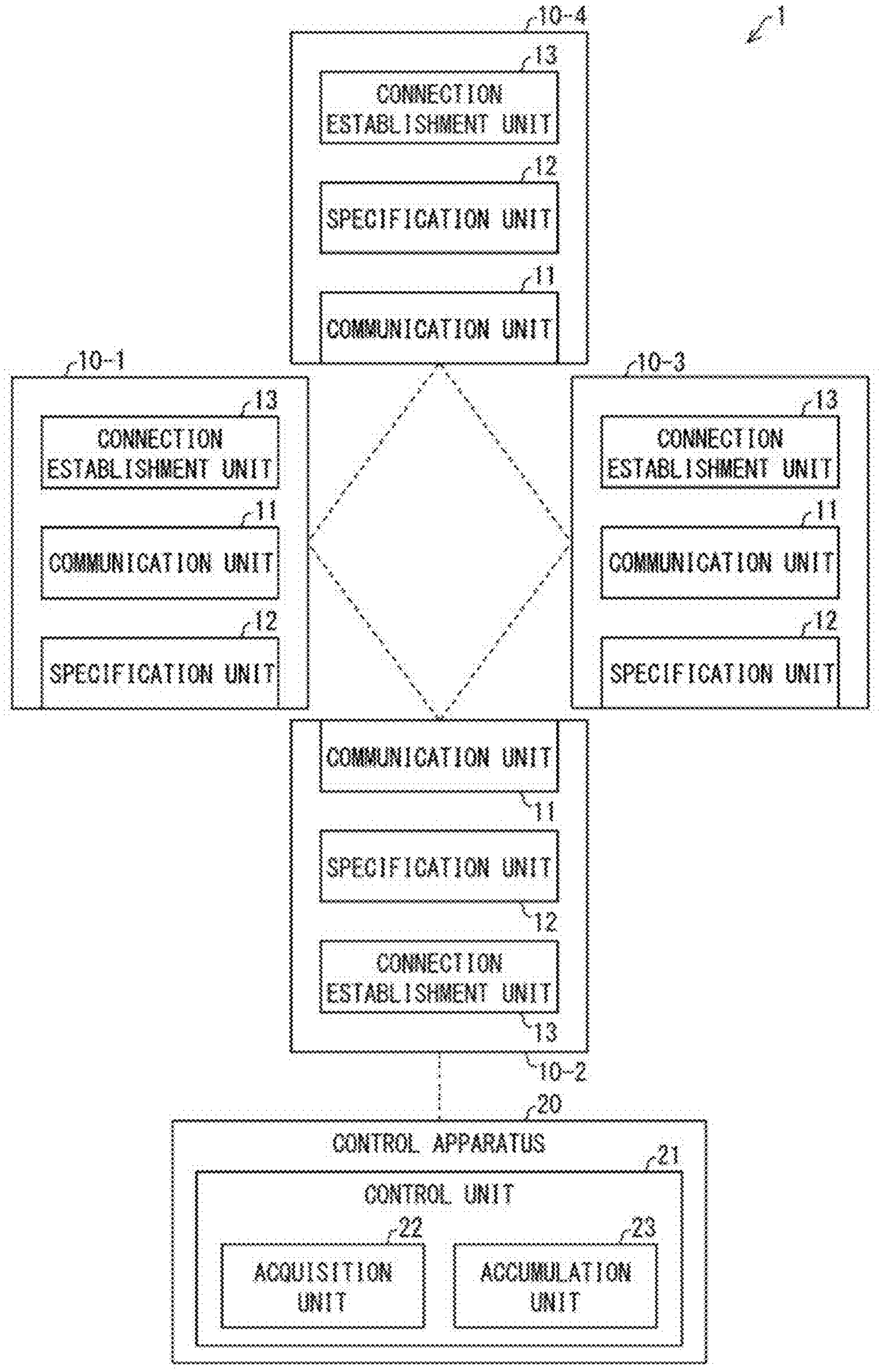
FIG. 3 is a diagram illustrating an example configuration of a communication system according to a second example embodiment of the present invention.

A configuration of a communication system 1 according to the second example embodiment will be described with reference to FIG. 3. FIG. 3 is a block diagram illustrating the configuration of the communication system 1. The communication system 1 according to the second example embodiment includes a plurality of communication apparatuses 10 and a control apparatus 20 as illustrated in FIG. 1.

(Communication Apparatus 10)

A first communication apparatus 10-1, a second communication apparatus 10-2, a third communication apparatus 10-3, and a fourth communication apparatus 10-4, which are illustrated in FIG. 3, are similar to the first communication apparatus 10-1, the second communication apparatus 10-2, the third communication apparatus 10-3, and the fourth communication apparatus 10-4, respectively, which are illustrated in FIG. 1.

(Control apparatus 20)

The control apparatus 20 controls the plurality of communication apparatuses 10.

The control apparatus 20 includes a control unit 21 as illustrated in FIG. 3. The control unit 21 is an example implementation of a control means.

(Control unit 21)

The control unit 21 controls the plurality of communication apparatuses 10.

For example, the control unit 21 refers to the information described earlier and managed by the control unit 21, and carries out, for example, the following:

- monitoring of each of the communication apparatuses 10 (especially, a boundary terminal);
- control of line connection between the communication apparatuses 10; and
- updating of a communication path (including updating of priority of the communication path).

Though not limiting the second example embodiment, an objective of control of the plurality of communication apparatuses 10 is exemplified by the following:

- support for connection of a new communication apparatus 10 to a meshed network;
- reconnection of disconnected lines; and
- updating of a communication path for preventing line communication quality deterioration or line disconnection.

The control unit 21 includes an acquisition unit 22 and an accumulation unit 23. The acquisition unit 22 and the accumulation unit 23 are an example implementation of an acquisition means and an accumulation means, respectively.

(Acquisition Unit 22)

The acquisition unit 22 acquires, from at least one communication apparatus included in the meshed network, the following:

- related information related to the at least one communication apparatus; and
- reference information different from the related information.

The reference information acquired by the acquisition unit 22 may include at least one selected from the group consisting of the following:

- weather information; and
- sensor information acquired by at least one external sensor.

The weather information may be configured to be acquired by the acquisition unit 22 via a communication means different from the meshed network. The sensor may be commonly a field sensor that senses an environment. For example, the field sensor may be configured to sense, for example, the amount of sunlight, atmospheric pressure, and/or temperature. The sensor transmits the sensor information to the control apparatus 200 via the meshed network.

(Accumulation Unit 23)

The accumulation unit 23 calculates correlation between the related information and the reference information, and accumulates correlation information indicative of the calculated correlation. A method in which the accumulation unit 23 calculates the correlation between the related information and the reference information is not particularly limited. For example, the accumulation unit 23 can be configured to use algorithms such as a regression analysis, a support vector machine, and a principal component analysis to calculate the correlation between the related information and the reference information.

By referring to the acquired reference information and the accumulated correlation information, the control apparatus can, for example, predict a deterioration in line quality or line disconnection and update (change) a communication path in accordance with a prediction result. For example, with reference to the related information, which is at least one selected from the group consisting of the following:

- a line quality of connection in which each of the communication apparatuses 10 is involved; and
- the number of times of disconnection in the connection in which each of the communication apparatuses 10 is involved, and the correlation information, which indicates the correlation between the related information and the reference information, the control apparatus 20 may predict the related information and update (change) the communication path so as not to include any communication apparatus 10 or connection in which a deterioration in line quality or an increase in number of times of disconnection is predicted. In addition, the control apparatus 20 may update (change) the communication path in accordance with a result of prediction of the related information such as a load state of each of the communication apparatuses 10. The control apparatus 20 may predict, for example, temporal regularity of the related information.

(Effect Brought about by Communication System 1)

As described above, the communication system 1 includes a plurality of communication apparatuses (for example, the first communication apparatus 10-1, the second communication apparatus 10-2, the third communication apparatus 10-3, and the fourth communication apparatus) and the control apparatus 20. A configuration is employed such that the communication apparatuses 10 each include:

- the at least one communication unit 11 that is configured to be capable of transmitting and receiving directional communication media;
- the specification unit 12 that specifies at least one connection destination candidate by carrying out scanning with use of the at least one communication unit 11; and
- the connection establishment unit 13 that establishes connection with the at least one connection destination candidate specified by the specification unit 12,
- the control apparatus 20 including
- the control unit 21 that controls a meshed network composed of the plurality of communication apparatuses 10 connecting to each other,
- the control unit 21 including:
- the acquisition unit 22 that acquires, from at least one communication apparatus included in the meshed network, not only related information related to the at least one communication apparatus but also reference information different from the related information; and
- the accumulation unit 23 that calculates correlation between the related information and the reference information, and accumulates correlation information indicative of the calculated correlation.

The communication system 1 configured as described above enables each of the communication apparatuses 10 to specify, by carrying out scanning with use of the communication unit 11, even a connection destination candidate whose position is not made clear in advance. Thus, it is possible to establish communication with the specified connection destination candidate.

A directional communication medium commonly has the following aspects. Specifically, the directional communication medium makes it possible to achieve large-capacity and low-delay communication. In contrast, the directional communication medium is susceptible to influence such as shielding and/or disturbance due to its directionality. The communication apparatus 10 according to the second example embodiment makes it possible to make, in a network in which a directional communication medium is used, adaptive changes including addition of a communication apparatus and a change in position. This makes it possible to configure a network that is less susceptible to influence such as shielding and/or disturbance.

The control apparatus 20 can also improve network stability by controlling the plurality of communication apparatuses 10. According to the control apparatus 20 according to the second example embodiment, control is carried out so that the correlation information, which indicates the correlation between the related information and the reference information, is accumulated. With this, a communication path to be connected with priority can be set with reference to the correlation information. This makes it possible to improve persistence of communication.

That is, the communication system 1 according to the second example embodiment makes it possible to achieve a robust communication network in which a directional communication medium is used.

(Effect Brought about by Control Apparatus 20)

A configuration is employed such that the control apparatus 20 according to the second example embodiment includes a control means that controls a plurality of communication apparatuses that are capable of configuring a meshed network, the plurality of communication apparatuses each including: at least one communication means that is configured to be capable of transmitting and receiving directional communication media; a specification means that specifies at least one connection destination candidate by carrying out scanning with use of the at least one communication means; and a connection establishment means that establishes connection with the at least one connection destination candidate specified by the specification means, the control means including: an acquisition means that acquires, from at least one communication apparatus included in the meshed network, not only related information related to the at least one communication apparatus but also reference information different from the related information; and an accumulation means that calculates correlation between the related information and the reference information, and accumulates correlation information indicative of the calculated correlation.

The control apparatus 20 configured as described above controls the plurality of communication apparatuses 10 that are capable of configuring a meshed network. The plurality of communication apparatuses 10 each can specify, by carrying out scanning with use of the communication unit 11, even a connection destination candidate whose position is not made clear in advance. The plurality of communication apparatuses 10 each can establish communication with the specified connection destination candidate. The control apparatus 20 can improve stability of a meshed network by thus controlling the plurality of communication apparatuses 10.

According to the control apparatus 20 according to the second example embodiment, a communication path to be connected with priority can be set. This makes it possible to improve persistence of communication and achieve a robust meshed network.

(Method for Controlling Communication System 1)

Figure 4:
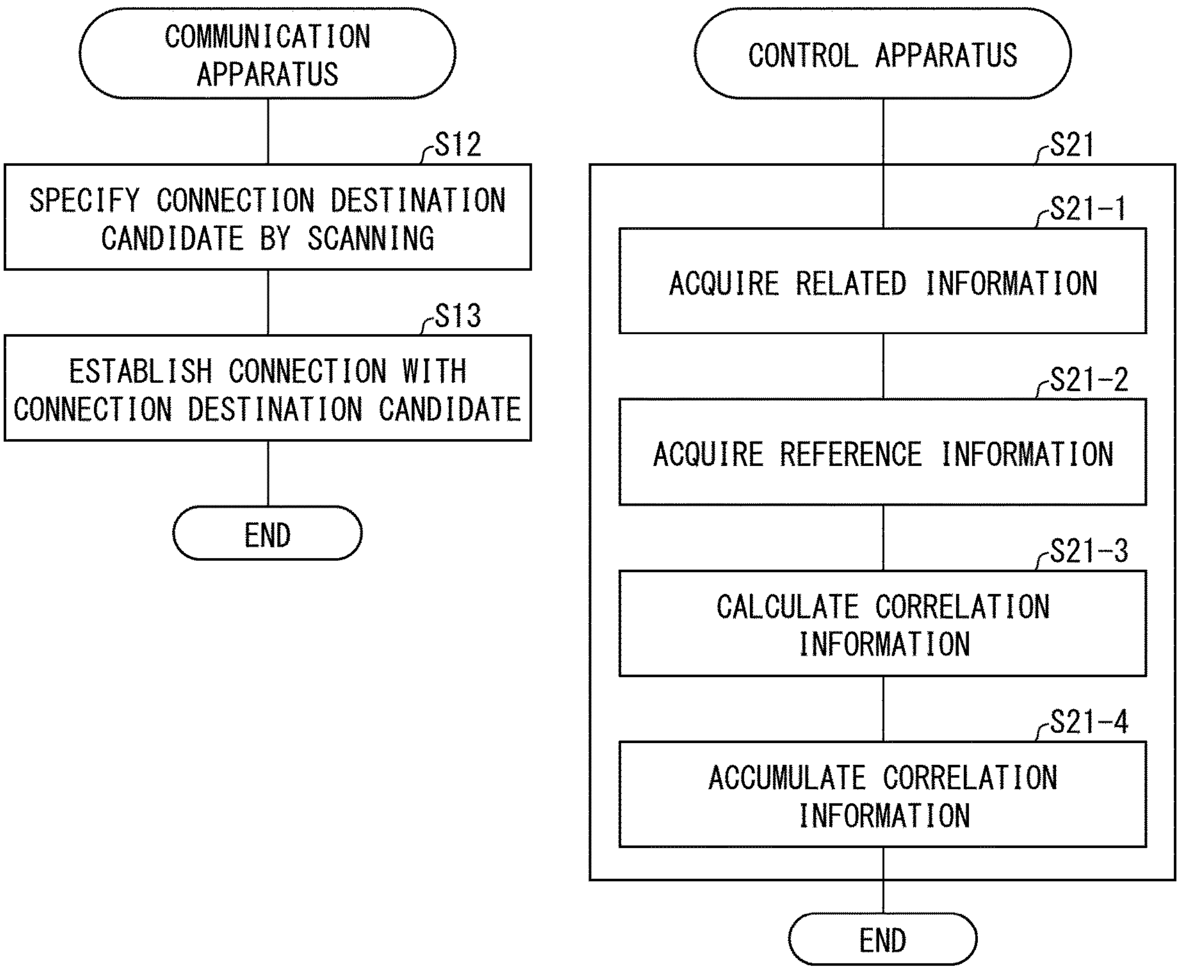
FIG. 4 is a block diagram illustrating a configuration of a communication apparatus according to the second example embodiment of the present invention.

A method for controlling the communication system 1 according to the second example embodiment will be described with reference to FIG. 4. FIG. 4 is a flowchart illustrating the method for controlling the communication system 1 according to the second example embodiment. As illustrated in FIG. 4, the method for controlling the communication system 1 includes steps S12 and S13 carried out by the communication apparatuses 10, and a step S21 carried out by the control apparatus 20.

(Steps S12 and S13)

The steps S12 and S13 carried out by the communication apparatuses 10 are as have been described in the first example embodiment (described earlier).

(Step S21)

The step S21 is carried out before/after the steps S12 and S13, or simultaneously with the steps S12 and S13. In the step S21, the control unit 21 controls the plurality of communication apparatuses 10. The step S21 includes steps S21-1, S21-2, S21-3, and S21-4.

(Step S21-1)

In the step S21-1, the acquisition unit 22 acquires related information for each of at least one communication apparatus 10 included in a meshed network.

(Step S21-2)

In the step S21-2, the acquisition unit 22 acquires reference information.

(Step S21-3)

In the step S21-3, the accumulation unit 23 calculates correlation between the related information acquired in the step S21-1 and the reference information acquired in the step S21-2.

(Step S21-4)

In the step S21-4, the accumulation unit 23 accumulates correlation information indicative of the correlation calculated in the step S21-3.

(Effect Brought about by Method for Controlling Communication System 1)

As described above, the method for controlling the communication system 1 according to the second example embodiment includes: the plurality of communication apparatuses 10 each (i) specifying at least one connection destination candidate by carrying out scanning with use of a directional communication medium (S12), and (ii) establishing connection with the at least one connection destination candidate thus specified (S13); and the control apparatus 20 controlling the plurality of communication apparatuses 10 (S21). The control apparatus 20 controlling the plurality of communication apparatuses 10 (S21) includes the control apparatus 20 (*a*) acquiring, from at least one communication apparatus included in the meshed network, not only related information related to the at least one communication apparatus (S21-1) but also reference information different from the related information (S21-2), and (b) calculating correlation between the related information and the reference information (S21-3), and accumulating correlation information indicative of the calculated correlation (S21-4).

The method for controlling the communication system 1 configured as described above enables each of the plurality of communication apparatuses 10 to specify, by carrying out scanning with use of the communication unit 11, even a connection destination candidate whose position is not made clear in advance. The method for controlling the communication system 1 enables each of the plurality of communication apparatuses 10 to establish communication with the specified connection destination candidate. The method for controlling the communication system 1 enables the control apparatus 20 to improve stability of a meshed network by controlling the plurality of communication apparatuses 10. Since the control apparatus 20 accumulates the correlation information, a communication path to be connected with priority can be set. This makes it possible to improve persistence of communication and achieve a robust meshed network.

Third Example Embodiment

A third example embodiment of the present invention will be described in detail with reference to the drawings. Note that members having functions identical to those of the respective members described in the first example embodiment are given respective identical reference numerals, and a description of those members is omitted as appropriate.

(Example Configuration of Communication System)

Figure 5:
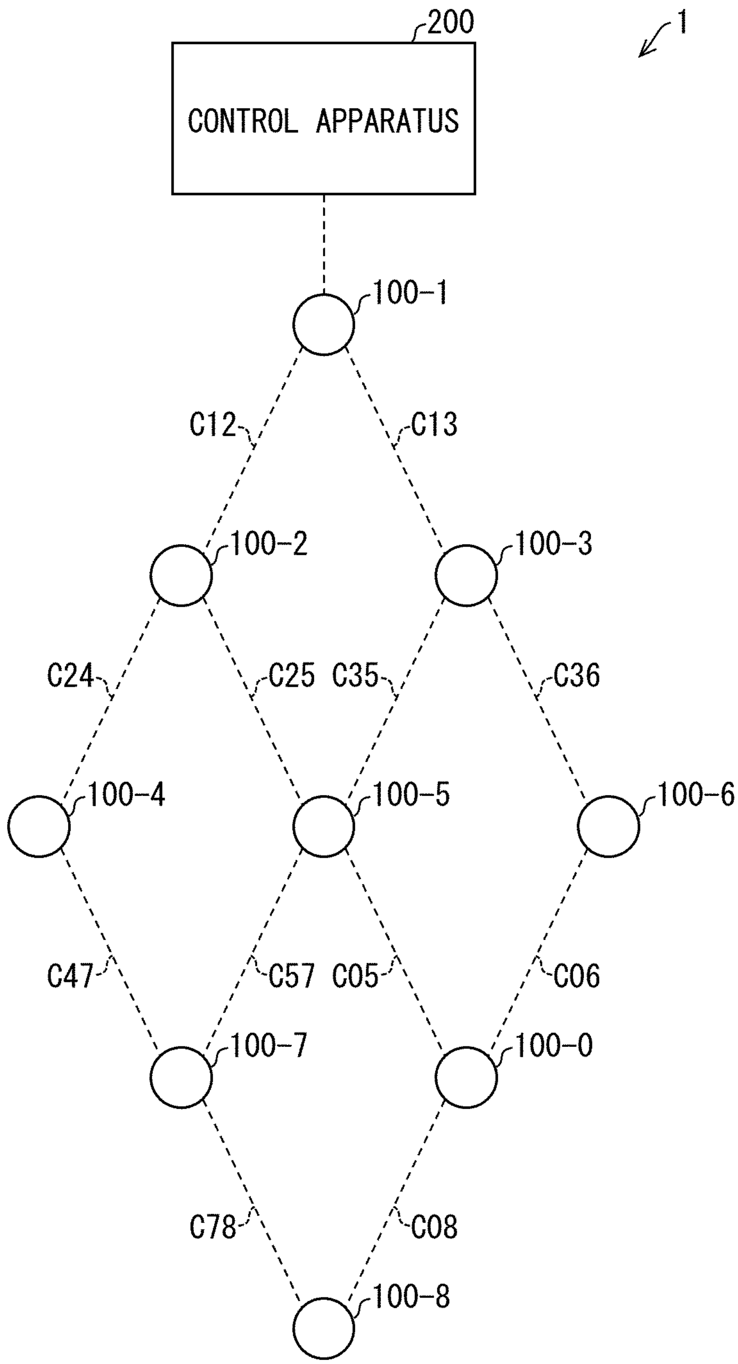
FIG. 5 is a diagram illustrating an example configuration of a communication system according to a third example embodiment of the present invention.

FIG. 5 is a diagram illustrating an example configuration of a communication system 1 according to the third example embodiment. In the example illustrated in FIG. 5, the communication system 1 includes a control apparatus 200 and a plurality of communication apparatuses (in FIG. 5, communication apparatuses 100-0 to 100-8). These communication apparatuses 100-0 to 100-8 have similar configurations. Thus, in the following description, a single communication apparatus will be taken up to be discussed as a communication apparatus 100.

In FIG. 5, a dotted line indicates an established connection. In FIG. 5, a reference sign "Cxy" (x and y are numerals) indicates a connection established between a communication apparatus 100-*x* and a communication apparatus 100-*y*. For example, C12 indicates a connection established between the communication apparatus 100-1 and the communication apparatus 100-2.

As illustrated in FIG. 5, the communication apparatuses included in the communication system 1 constitute a mesh network having a communication path that is spread in net form.

In FIG. 5, any of the communication apparatuses 100-0 to 100-8 may be configured to function as an edge terminal. Alternatively, the communication system 1 may be configured to include not only the communication apparatuses illustrated in FIG. 6 but also at least one edge terminal connected to any of the communication apparatuses.

The edge terminal herein refers to a terminal serving as an end of an access link in the meshed network of the communication system 1. Examples of the edge terminal include a communication terminal connecting to another network different from the communication system 1, and a user terminal used by a user.

(Configuration of Communication Apparatus 100)

Figure 6:
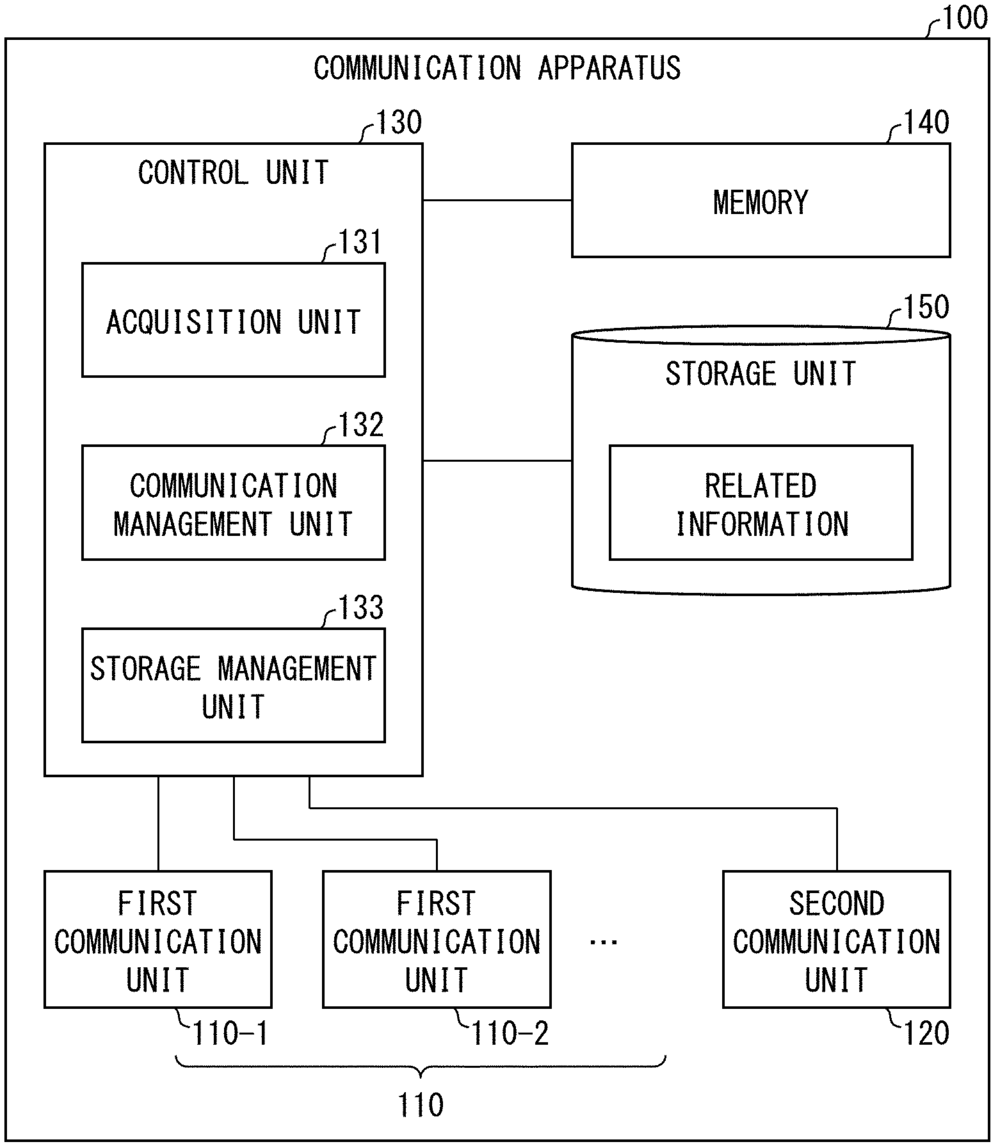
FIG. 6 is a block diagram illustrating a configuration of a communication apparatus according to the third example embodiment of the present invention.

A configuration of the communication apparatus 100 will be described with reference to FIG. 6. FIG. 6 is a block diagram illustrating the configuration of the communication apparatus 100.

The communication apparatus 100 includes a first communication unit 110, a second communication unit 120, a control unit 130, a memory 140, and a storage unit 150 as illustrated in FIG. 6. Note here that the first communication unit 110 is an example implementation of the communication means.

(First Communication Unit 110)

The first communication unit 110 is configured to be capable of transmitting and receiving directional communication media. The first communication unit 110 is constituted by, for example, a plurality of communication units such as a communication unit 110-1, a communication unit 110-2, . . . as illustrated in FIG. 6.

As described above, each of the communication units 110-1, 110-2, . . . is configured to be capable of transmitting and receiving directional communication media. Note here that a specific configuration of each of the communication units 110-1, 110-2, . . . does not limit the third example embodiment. For example, each of the communication units 110-1, 110-2, . . . includes a transmission unit that transmits a directional communication medium, and a reception unit that receives a directional communication medium. Each of the communication units 110-1, 110-2, . . . may be configured to include an integrated transmission and reception unit that transmits and receives directional communication media.

A specific example of a directional communication medium that the first communication unit 110 uses for communication does not limit the third example embodiment. For example, as in the case of the first example embodiment, such a directional communication medium can be exemplified by high frequency domain electromagnetic waves having a frequency of approximately 10 GHz or more. The high frequency domain electromagnetic waves may include millimeter waves, submillimeter waves, infrared light, visible light, and ultraviolet light.

For example, the first communication unit 110 uses the high frequency domain electromagnetic waves as the directional communication medium (described earlier) for communication by directing and transmitting the high frequency domain electromagnetic waves into a predetermined range of angles. Note here that a specific configuration that allows the first communication unit 110 to direct the high frequency domain electromagnetic waves does not limit the third example embodiment. For example, as in the case of the first example embodiment, each of the communication units 110-1, 110-2, . . . constituting the first communication unit 110 can be configured to include, for example, the following:

- a beamforming antenna for directing and transmitting millimeter waves or submillimeter waves into a predetermined range of angles;
- a collimator for collimating infrared light, visible light, or ultraviolet light; and
- a laser oscillator for generating a laser of infrared light, visible light, or ultraviolet light.

The communication units 110-1, 110-2, . . . each constituting the first communication unit 110 may be directed so as to carry out transmission and reception in ranges different from each other. For example, the communication units 110-1, 110-2, . . . may be directed such that the communication unit 110-1 is to carry out transmission and reception in a range of azimuth angles of 0° to 90°, the communication unit 110-2 is to carry out transmission and reception in a range of azimuth angles of 90° to 180°, the communication unit 110-3 is to carry out transmission and reception in a range of azimuth angles 180° to 270°, and the communication unit 110-4 is to carry out transmission and reception in a range of azimuth angles 270° to 360°.

(Second Communication Unit 120)

The second communication unit 120 is configured to carry out communication with use of a communication medium different from the directional communication medium used by the first communication unit 110 for communication. For example, the second communication unit 120 communicates with another apparatus via, for example, a wired or wireless local area network, or a global network. For example, the second communication unit 120 may communicate with the control apparatus 200.

(Control Unit 130)

The control unit 130 includes an acquisition unit 131, a communication management unit 132, and a storage management unit 133 as illustrated in FIG. 6. The communication management unit 132 is an example implementation of the specification means and the connection establishment means.

(Acquisition Unit 131)

The acquisition unit 131 acquires related information related to a communication destination with which to communicate by the first communication unit 110. Note here that the communication destination with which to communicate by the first communication unit 110 includes at least one selected from the group consisting of the following:

- at least one connection destination candidate specified by causing the communication management unit 132 (described later) to carry out scanning with use of the first communication unit 110; and
- among the specified at least one connection destination candidate, a connection destination with connection established by the communication management unit 132.

The related information acquired by the acquisition unit 131 will be described later.

(Communication Management Unit 132)

The communication management unit 132 manages a communication process in which the first communication unit 110 is used. For example, the communication management unit 132 carries out, for example, the following processes:

- scanning with use of the first communication unit 110;
- establishment of connection with use of the first communication unit 110;
- disconnection with use of the first communication unit 110; and
- switching of connection with use of the first communication unit 110.

A specific example process carried out by the communication management unit 132 will be described later.

(Storage Management Unit 133)

The storage management unit 133 manages a process of storage in the storage unit 150. For example, the storage management unit 133 stores, in the storage unit 150, the related information acquired by the acquisition unit 131. The storage management unit 133 also reads various kinds of information stored in the storage unit 150, and provides the information to each unit of the control unit 130.

(Flow from Scanning to Connection Establishment)

Subsequently, a flow of a process from implementation of scanning with use of the first communication unit 110 to connection establishment, the process being carried out by the communication management unit 132, will be described with reference to FIGS. 7 to 10.

(First Example of Flow from Scanning to Connection Establishment)

Figure 7:
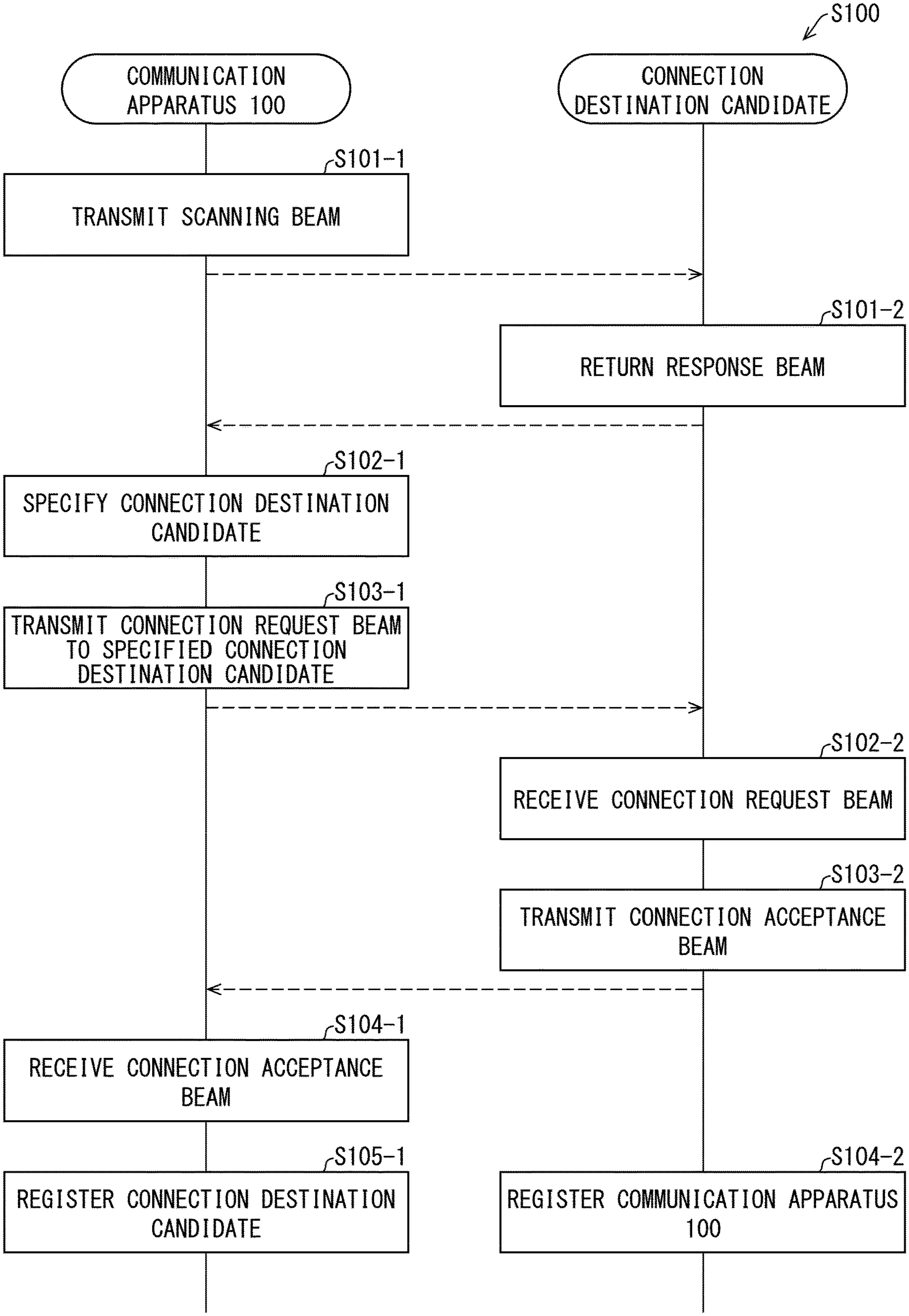
FIG. 7 is a sequence diagram illustrating a first example of a flow of a process from scanning to connection establishment in the communication system according to the third example embodiment of the present invention.

FIG. 7 is a sequence diagram illustrating a first example of the flow of the process from scanning with use of the first communication unit 110 to connection establishment, the process being carried out by the communication management unit 132. The first example is an example of a case where the communication apparatus 100 transmits a scanning beam first, and connection with a connection destination candidate present in a scanning target range is established.

(Step S101-1)

In a step S101-1, the communication management unit 132 uses the first communication unit 110 to transmit a scanning beam with a predetermined scanning range as a target. The transmitted scanning beam reaches a connection destination candidate present in the predetermined scanning range.

(Step S101-2)

In a step S101-2, the connection destination candidate existing in the scanning range returns a response beam as a response to the scanning beam to the communication apparatus 100. The returned response beam reaches the communication apparatus 100.

Note that a specific configuration for the connection destination candidate to return the response beam does not limit the third example embodiment. For example, the connection destination candidate may be configured to include a corner cube reflector, use the corner cube reflector to reflect a scanning beam, and return the reflected scanning beam as a response beam to the communication apparatus 100. As another example, the connection destination candidate may be configured to include a receiving apparatus that receives a scanning beam, and a transmitting apparatus that transmits a response beam in a direction in which the scanning beam has been received.

(Step S102-1)

In a step S102-1, the communication management unit 132 specifies a communication destination candidate with reference to the response beam received from the connection destination candidate.

For example, the communication management unit 132 specifies a position of the connection destination candidate in accordance with a direction of the received response beam. More specifically, the communication management unit 132 specifies, in accordance with the direction of the received response beam, a direction of the connection destination candidate as viewed from the communication apparatus 100. In other words, the communication management unit 132 specifies, in accordance with the direction of the received response beam, at least one selected from the group consisting of an azimuth angle, an elevation angle, and a depression angle of the connection destination candidate as viewed from the communication apparatus 100.

(Step S103-1)

In a step S103-1, the communication management unit 132 transmits a connection request beam to the connection destination candidate specified in the step S102-1. The connection request beam may be configured to include, for example, not only information indicative of a request for connection but also identification information for identifying the communication apparatus 100 from another apparatus. The connection request beam may also be configured to include related information managed by the storage management unit 133 and pertaining to the communication apparatus 100 and another communication apparatus.

(Step S102-2)

In a step S102-2, the connection destination candidate receives the connection request beam transmitted in the step S103-1. The connection destination candidate specifies the communication apparatus 100 with reference to the connection request beam transmitted in the step S103-1. For example, the connection destination candidate specifies a position of the communication apparatus 100 in accordance with the direction of the received connection request beam. More specifically, the connection destination candidate specifies, in accordance with the direction of the received connection request beam, the direction of the communication apparatus 100 as viewed from the connection destination candidate. In other words, the connection destination candidate specifies, in accordance with the direction of the received connection request beam, at least one selected from the group consisting of an azimuth angle, an elevation angle, and a depression angle of the communication apparatus 100 as viewed from the connection destination candidate.

(Step S103-2)

In a step S103-2, the connection destination candidate transmits a connection acceptance beam to the communication apparatus 100. The connection acceptance beam may be configured to include not only information indicative of acceptance of connection but also identification information for identifying the connection destination candidate from another apparatus. The connection acceptance beam may also be configured to include related information related to the connection destination candidate and the another communication apparatus.

(Step S104-1)

In a step S104-1, the communication management unit 132 receives the connection acceptance beam transmitted in the step S103-2.

(Step S105-1)

In a step S105-1, the storage management unit 133 registers the connection destination candidate as a connection destination with reference to the connection acceptance beam received in the step S104-1. For example, the storage management unit 133 stores, in the storage unit, identification information of the connection destination candidate, the identification information being included in the connection acceptance beam. For example, the step S105-1 results in establishment of connection from the communication apparatus 100 to the connection destination candidate.

(Step S104-2)

In a step S104-2, the connection destination candidate refers to the connection request beam received in the step S102-2, and registers the communication apparatus 100 as a connection destination. For example, the connection destination candidate stores, in a storage unit included in the connection destination candidate, identification information of the communication apparatus 100, the identification information being included in the connection request beam. For example, the step S104-2 results in establishment of connection from the connection destination candidate to the communication apparatus 100.

(Second Example of Flow from Scanning to Connection Establishment)

Figure 8:
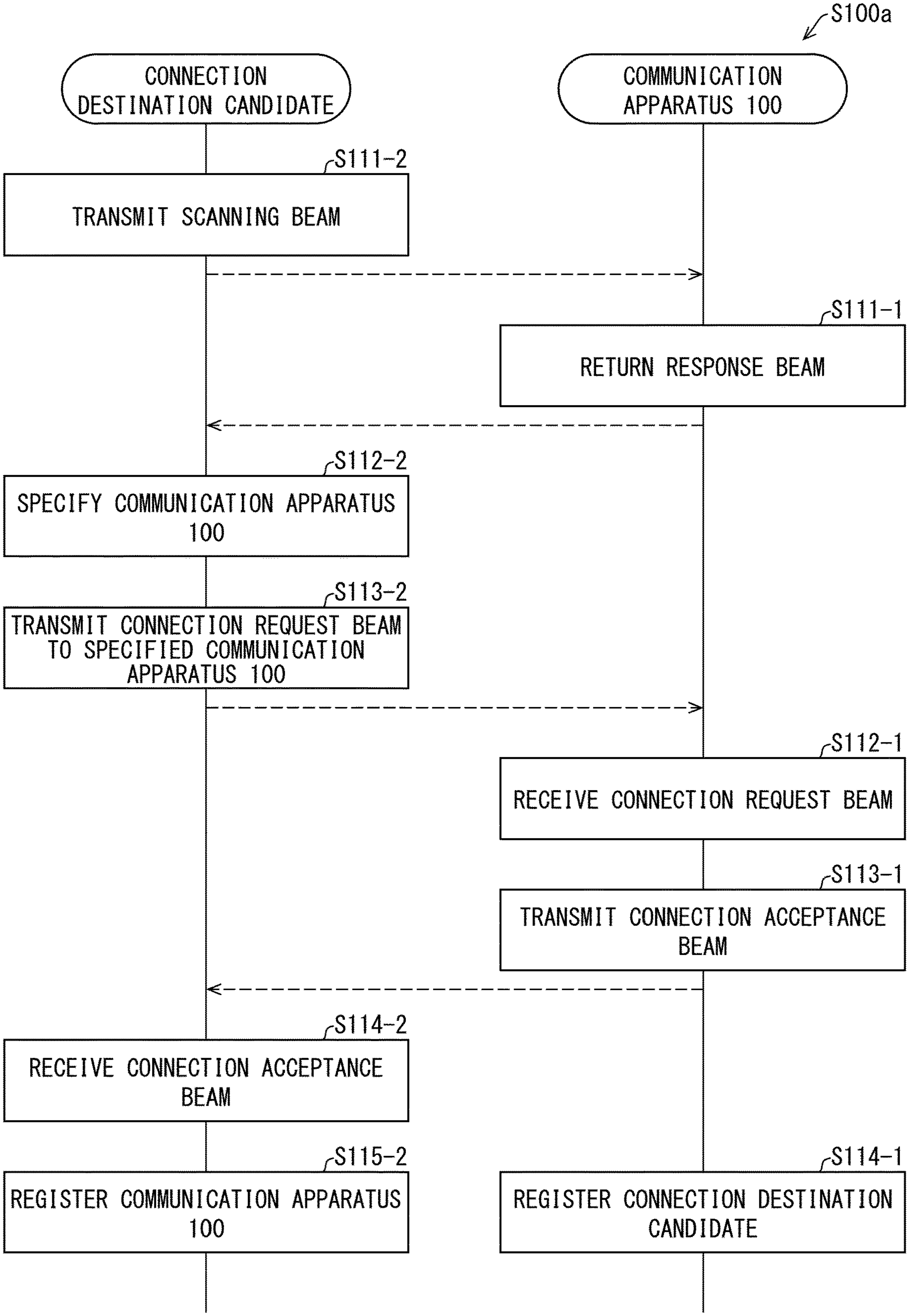
FIG. 8 is a sequence diagram illustrating a second example of the flow of the process from scanning to connection establishment in the communication system according to the third example embodiment of the present invention.

FIG. 8 is a sequence diagram illustrating a second example of the flow of the process from scanning with use of the first communication unit 110 to connection establishment, the process being carried out by the communication management unit 132. The second example is an example of a case where a connection destination candidate transmits a scanning beam first, and connection with the communication apparatus 100 present in a scanning target range is established.

As illustrated in FIG. 8, the process of the flow from scanning to connection establishment according to the second example is obtained by exchanging the communication apparatus 100 and the connection destination candidate in the process which has been described with reference to FIG. 7 and in which the communication apparatus 100 and the connection destination are connected. Since processes illustrated in FIG. 8 and carried out in respective steps are clear with reference to FIG. 7, a specific description thereof is omitted here.

(Third Example of Flow from Scanning to Connection Establishment)

Figure 9:
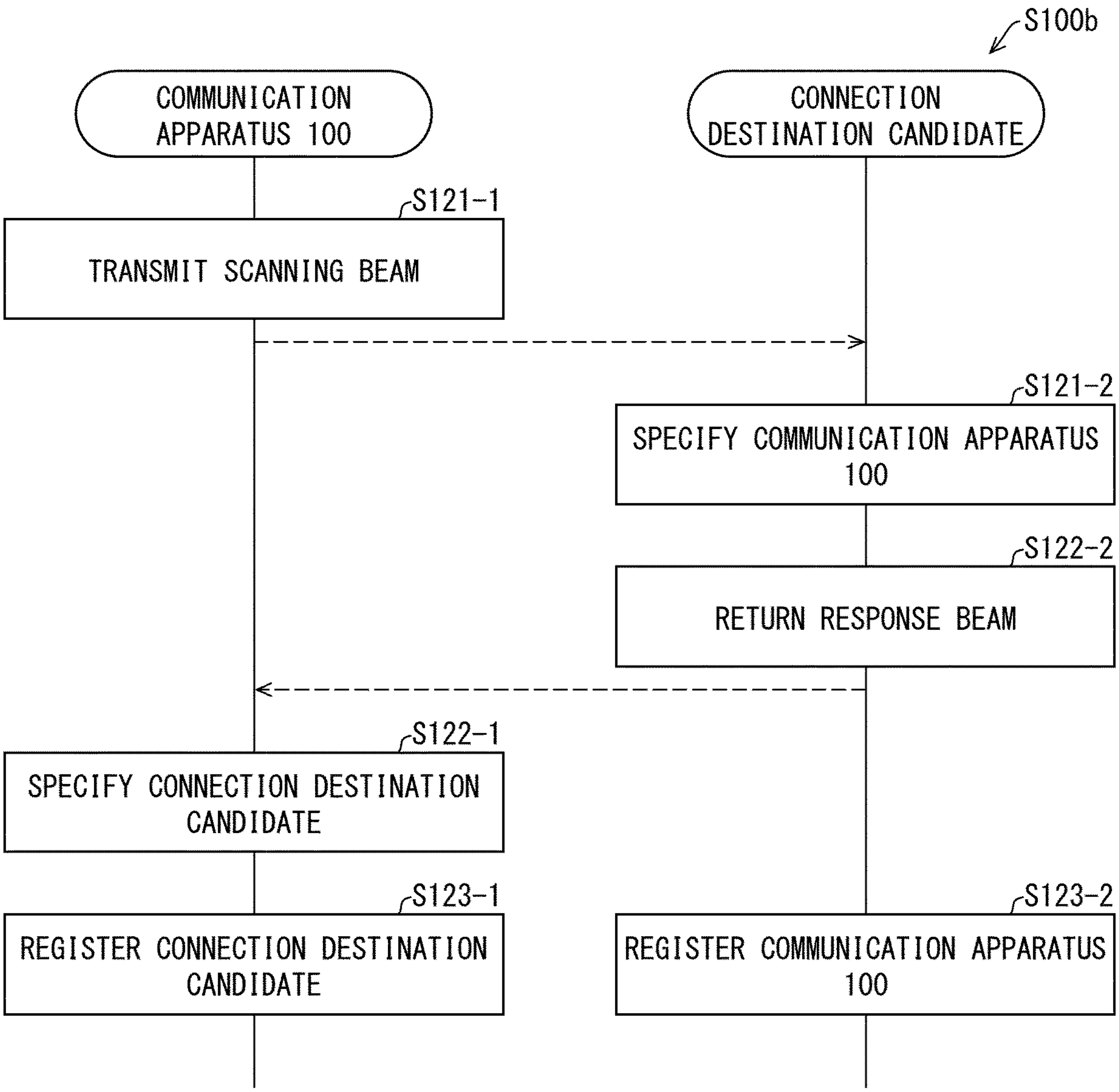
FIG. 9 is a sequence diagram illustrating a third example of the flow of the process from scanning to connection establishment in the communication system according to the third example embodiment of the present invention.

FIG. 9 is a sequence diagram illustrating a third example of the flow of the process from scanning with use of the first communication unit 110 to connection establishment, the process being carried out by the communication management unit 132. The third example is an example of a case where the communication apparatus 100 transmits a scanning beam first, and connection with a connection destination candidate present in a scanning target range is established.

(Step S121-1)

In a step S121-1, the communication management unit 132 uses the first communication unit 110 to transmit a scanning beam with a predetermined scanning range as a target. The transmitted scanning beam reaches a connection destination candidate present in the predetermined scanning range.

The scanning beam transmitted in the step S121-1 may be configured to include, for example, not only information indicative of a request for connection but also identification information for identifying the communication apparatus 100 from another apparatus. The scanning beam may also be configured to include related information managed by the storage management unit 133 and pertaining to the communication apparatus 100 and another communication apparatus.

(Step S121-2)

In a step S121-2, the connection destination candidate specifies the communication apparatus 100 with reference to the scanning beam transmitted in the step S121-1. For example, the connection destination candidate specifies the position of the communication apparatus 100 in accordance with a direction of the scanning beam transmitted in the step S121-1. More specifically, the connection destination candidate specifies, in accordance with the direction of the received scanning beam, the direction of the communication apparatus 100 as viewed from the connection destination candidate. In other words, the connection destination candidate specifies, in accordance with the direction of the received scanning beam, at least one selected from the group consisting of an azimuth angle, an elevation angle, and a depression angle of the communication apparatus 100 as viewed from the connection destination candidate.

Furthermore, in the step S121-2, the connection destination candidate may be configured to specify the communication apparatus 100 with further reference to the identification information of the communication apparatus 100, the identification information being included in the scanning beam.

(Step S122-2)

In a step S122-2, the connection destination candidate transmits, to the communication apparatus 100, a response beam as a response to the scanning beam transmitted in S121-2. The transmitted response beam reaches the communication apparatus 100.

The response beam transmitted in the step S122-2 may be configured to include, for example, not only information indicative of acceptance of connection but also identification information for identifying the connection destination candidate from another apparatus. The response beam may also be configured to include related information managed by the connection destination candidate and pertaining to the connection destination candidate and another communication apparatus.

(Step S122-1)

In a step S122-1, the communication management unit 132 specifies the connection destination candidate with reference to the response beam transmitted in the step S122-2.

For example, the communication management unit 132 specifies a position of the connection destination candidate in accordance with a direction of the received response beam. More specifically, the communication management unit 132 specifies, in accordance with the direction of the received response beam, a direction of the connection destination candidate as viewed from the communication apparatus 100. In other words, the communication management unit 132 specifies, in accordance with the direction of the received response beam, at least one selected from the group consisting of an azimuth angle, an elevation angle, and a depression angle of the connection destination candidate as viewed from the communication apparatus 100.

Furthermore, in the step S122-1, the communication management unit 132 may be configured to specify the connection destination candidate with further reference to the identification information of the connection destination candidate, the identification information being included in the response beam.

(Step S123-1)

In a step S123-1, the storage management unit 133 registers the connection destination candidate as a connection destination with reference to the response beam received from the connection destination candidate. For example, the storage management unit 133 stores, in the storage unit, the identification information of the connection destination candidate, the identification information being included in the response beam. For example, the step S123-1 results in establishment of connection from the communication apparatus 100 to the connection destination candidate.

(Step S123-2)

In a step S123-2, the connection destination candidate registers the communication apparatus 100 as the connection destination with reference to the scanning beam received from the communication apparatus 100. For example, the connection destination candidate stores, in the storage unit included in the connection destination candidate, the identification information of the communication apparatus 100, the identification information being included in the scanning beam. For example, the step S123-2 results in establishment of connection from the connection destination candidate to the communication apparatus 100.

(Fourth Example of Flow from Scanning to Connection Establishment)

Figure 10:
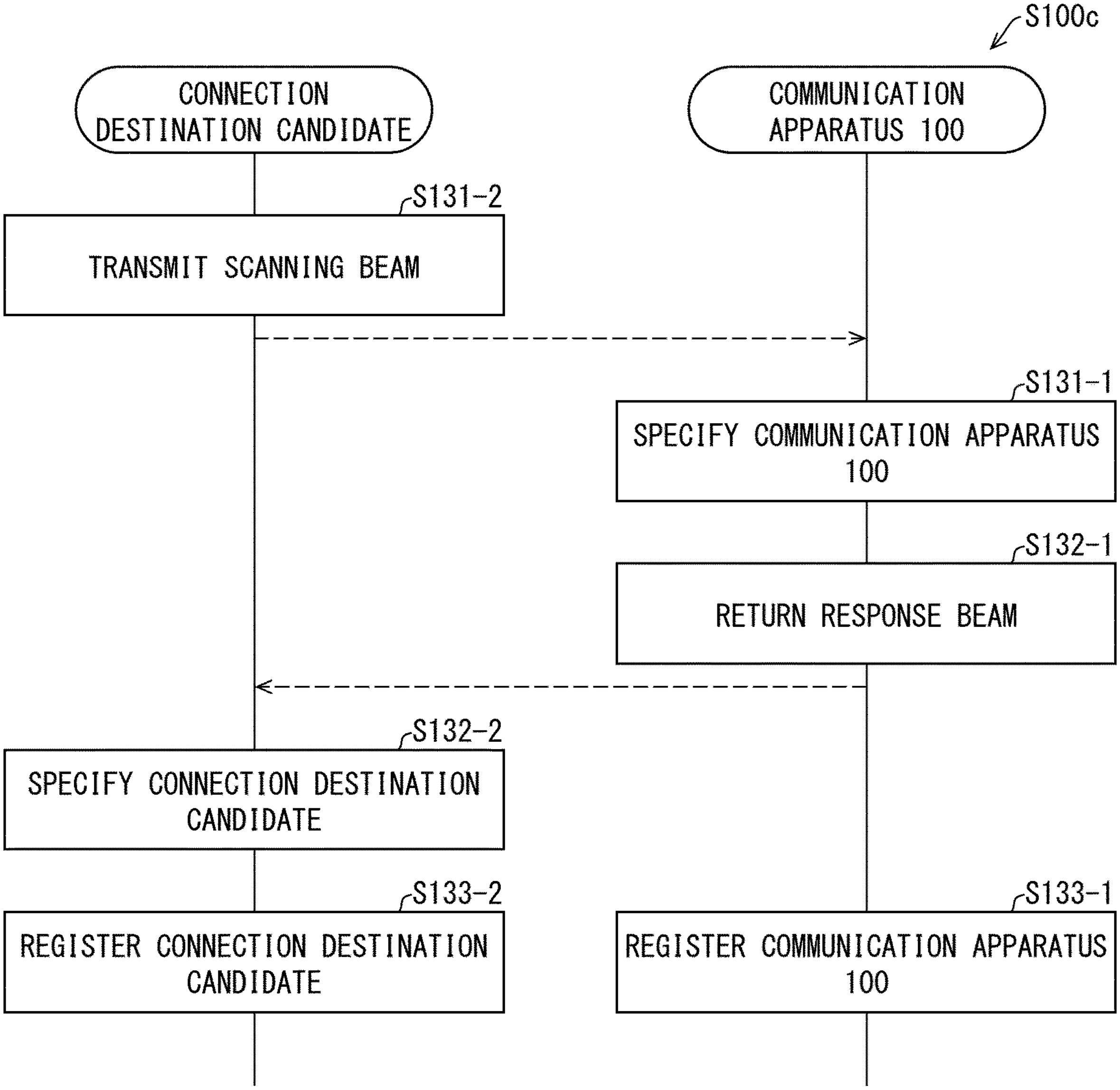
FIG. 10 is a sequence diagram illustrating a fourth example of the flow of the process from scanning to connection establishment in the communication system according to the third example embodiment of the present invention.

FIG. 10 is a sequence diagram illustrating a fourth example of the flow of the process from scanning with use of the first communication unit 110 to connection establishment, the process being carried out by the communication management unit 132. The fourth example is an example of a case where a connection destination candidate transmits a scanning beam first, and connection with the communication apparatus 100 present in a scanning target range is established.

As illustrated in FIG. 10, the process of the flow from scanning to connection establishment according to the fourth example is obtained by exchanging the communication apparatus 100 and the connection destination candidate in the process which has been described with reference to FIG. 9 and in which the communication apparatus 100 and the connection destination are connected. Since processes illustrated in FIG. and carried out in respective steps are clear with reference to FIG. 9, a specific description thereof is omitted here.

The above description has discussed the examples of the flow of the process from scanning to connection establishment. Note, however, that the examples described above do not limit the third example embodiment.

For example, in the second example described earlier, the communication apparatus 100 may establish connection with a communication destination candidate (referred to as "communication destination candidate B" for convenience) that is different from a communication destination candidate (referred to as "communication destination candidate A" for convenience) which has transmitted the scanning beam. In such a case, for example, the communication apparatus 100 may be configured to refer to the related information included in the connection request beam transmitted in the step S113-2, specify the communication destination candidate B, and establish connection with the specified communication destination candidate B.

Similarly, in the fourth example described earlier, the communication apparatus 100 may establish connection with a communication destination candidate (referred to as "communication destination candidate B" for convenience) that is different from a communication destination candidate (referred to as "communication destination candidate A" for convenience) which has transmitted the scanning beam. In such a case, for example, the communication apparatus 100 may be configured to refer to the related information included in the scanning beam transmitted in the step S131-2, specify the communication destination candidate B, and establish connection with the specified communication destination candidate B.

(Related Information)

The acquisition unit 131 included in the communication apparatus 100 acquires, for example, related information pertaining to an apparatus of the communication destination of the communication apparatus 100. The storage management unit 133 included in the communication apparatus 100 stores, in the storage unit 150, the related information acquired by the acquisition unit 131, and manages the related information. Note here that the communication destination of the communication apparatus 100 at least includes at least one selected from the group consisting of the following: at least one connection destination candidate specified by the communication management unit 132; and at least one connection destination with connection established by the communication management unit 132.

Furthermore, the storage management unit 133 can be configured to also store, in the storage unit 150, related information related to the communication apparatus 100, and manage the related information.

One of the plurality of communication apparatuses is hereinafter referred to as a communication apparatus A. The following description discusses details of related information of the communication apparatus A in a case where communication apparatuses B, C, and D are present as the communication destination of the communication apparatus A. The communication apparatuses A, B, C, and D are each, for example, any of the communication apparatuses 100-0 to 100-8 illustrated in FIG. 5.

First, the related information of the communication apparatus A includes at least one selected from the group consisting of the following:

positional information of the communication apparatus A;

a load state of the communication apparatus A;

the number of established connections in which the communication apparatus A is involved;

the number of specified connection destination candidates in which the communication apparatus A is involved;

a connection state of connection in which the communication apparatus A is involved; and a hop count from the communication apparatus A to a connection reference point.

Note here that a specific example of the positional information of the communication apparatus A does not limit the third example embodiment. For example, the positional information may be coordinate information assigned by a predetermined position specifying system such as a GPS, positional identification information such as an address assigned in advance to a target communication region, or information indicative of a direction of the communication apparatus A as viewed from a communication apparatus in a surrounding area of the communication apparatus A.

A specific indicator of the load state of the communication apparatus A does not limit the third example embodiment. For example, the specific indicator may be information indicative of an operation rate of a processor such as a control unit included in the communication apparatus A, or information indicative of an operation rate of a specific task carried out by the processor such as the control unit included in the communication apparatus A.

The connection in which the communication apparatus A is involved includes at least one selected from the group consisting of the following: a connection to/from the communication apparatus A; and a connection through the communication apparatus A. Thus, in the case of the example described above, the connection in which the communication apparatus A is involved includes at least one selected from the group consisting of the following: a connection between the communication apparatus A and the communication apparatus B; a connection between the communication apparatus A and the communication apparatus C; and a connection between the communication apparatus A and the communication apparatus D.

The connection state of connection in which a communication destination A described earlier is involved includes at least one selected from the group consisting of the following:

a line quality of the connection in which the communication apparatus A is involved; and the number of times of disconnection in the connection in which the communication apparatus A is involved.

Note here that a specific indicator pertaining to the line quality of the connection in which the communication apparatus A is involved does not limit the third example embodiment. For example, the specific indicator includes any of indicators such as a delay in communication due to the connection and a rate of loss of information in communication due to the connection.

Note also that a specific indicator pertaining to the number of times of disconnection in the connection in which the communication apparatus A is involved does not limit the third example embodiment. For example, the specific indicator includes an indicator pertaining to the number of times of disconnection per unit time in communication by the connection.

The related information of the communication apparatus A may be configured to include the following:

information pertaining to an influence of an environment on the connection in which the communication apparatus A is involved.

Note here that for example, the information pertaining to the influence of the environment on the connection in which the communication apparatus A is involved includes at least one selected from the group consisting of the following:

- a degree of influence of sunlight on the connection between the communication apparatus A and the communication apparatus B;
- a degree of influence of sunlight on the connection between the communication apparatus A and the communication apparatus C; and
- a degree of influence of sunlight on the connection between the communication apparatus A and the communication apparatus D.

A degree of influence of sunlight on a certain connection can be expressed by, for example, an angle in a solar direction with reference to a direction along the certain connection. For example, in a case where an angle between the direction along the certain connection and the solar direction is close to 90°, information pertaining to the influence indicates that the influence of sunlight on the certain connection is relatively small. In contrast, for example, in a case where the angle between the direction along the certain connection and the solar direction is close to 0°, the information pertaining to the influence indicates that the influence of sunlight on the certain connection is relatively large.

The information pertaining to the influence of the environment on the connection in which the communication apparatus A is involved may be configured to include, as another example, information indicative of an influence of reflection and/or absorption on a directional communication medium used by a communication unit of the communication apparatus A. For example, in a case where the directional communication medium used by the communication unit of the communication apparatus A propagates through air, the information pertaining to the influence of the environment on the connection in which the communication apparatus A is involved may be configured to include information such as transparency of the air and information such as a building near a propagation path.

(Configuration of Control Apparatus)

Figure 11:
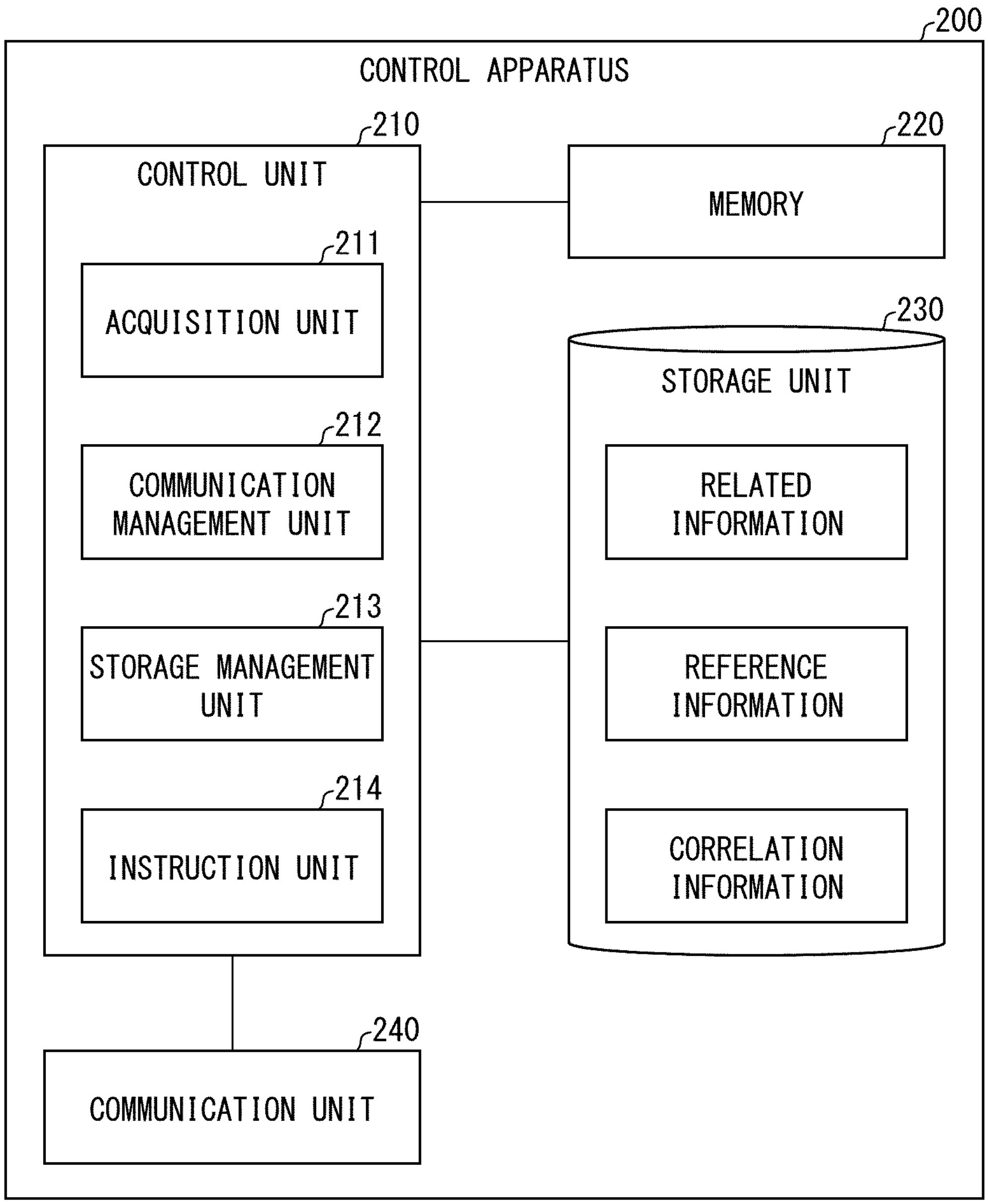
FIG. 11 is a block diagram illustrating a configuration of a control apparatus according to the third example embodiment of the present invention.

A configuration of the control apparatus 200 according to the third example embodiment will be described with reference to FIG. 11. FIG. 11 is a block diagram illustrating the configuration of the control apparatus 200. The control apparatus 200 according to the third example embodiment includes a control unit 210, a memory 220, a storage unit 230, and a communication unit 240 as illustrated in FIG. 11.

(Control Unit 210)

The control unit 210 includes an acquisition unit 211, a communication management unit 212, a storage management unit 213, and an instruction unit 214 as illustrated in FIG. 11. The acquisition unit 211 is an example implementation of the acquisition means. The storage management unit 133 is an example implementation of a storage means.

(Acquisition Unit 211)

The acquisition unit 211 acquires, from a corresponding communication apparatus 100, related information related to each of the communication apparatuses 100. In the third example embodiment, the acquisition unit 211 acquires related information acquired by the acquisition unit 131 of the control unit 130 included in each of the communication apparatuses 100.

As illustrated earlier, the related information related to each of the communication apparatuses 100 may include at least one selected from the group consisting of the following pieces of related information:

- positional information of a communication apparatus 100;
- a load state of the communication apparatus 100;
- the number of established connections in which the communication apparatus 100 is involved;
- a connection state of connection in which the communication apparatus 100 is involved;
- a line quality of the connection in which the communication apparatus 100 is involved;
- the number of times of disconnection in the connection in which the communication apparatus 100 is involved;
- information pertaining to an influence of an environment on the connection in which the communication apparatus 100 is involved; and
- scanning from another communication apparatus 100 with respect to the communication apparatus 100.

Note here that the connection state of the connection in which the communication apparatus 100 is involved includes the following:

- a connection state of an access link in which the communication apparatus 100 is involved; and
- a connection state of a backbone link in which the communication apparatus 100 is involved.

The information pertaining to the influence of the environment on the connection in which the communication apparatus 100 is involved includes information pertaining to the following:

- an influence of sunlight on the connection in which the communication apparatus 100 is involved; and
- an influence of reflected light on the connection in which the communication apparatus 100 is involved.

The acquisition unit 211 may further acquire pieces of reference information as listed below.

- weather information
- sensor information

For example, the acquisition unit 211 may acquire weather information from a server apparatus that provides external weather information. The acquisition unit 211 may acquire sensor information from an external field sensor. The field sensor may be commonly a field sensor that senses an environment. For example, the field sensor may be configured to sense, for example, the amount of sunlight, atmospheric pressure, and/or temperature.

(Communication Management Unit 212)

The communication management unit 212 manages a communication process in which the communication unit 240 is used, and manages transmission and reception between the communication apparatuses 100-0 to 100-8.

For example, the communication management unit 212 may set a communication path. In a case where communication from the first communication apparatus 100 to the second communication apparatus 100 is carried out, the communication management unit 212 sets, with reference to the related information acquired by the acquisition unit 211, a communication path from the first communication apparatus 100 to the second communication apparatus 100, and instructs each of the communication apparatuses 100 on the communication path.

The communication management unit 212 may (i) give priority to at least one communication path with reference to related information related to a communication apparatus 100 which is involved in the at least one communication path, the at least one communication path being included in a meshed network, and (ii) control, in accordance with the priority, a communication path to which the priority has been given, e.g., reset the communication path from the first communication apparatus 100 to the second communication apparatus 100 to a communication path with high priority.

For example, the communication management unit 212 may monitor at least one communication apparatus 100 among the plurality of communication apparatuses 100 with reference to the related information acquired by the acquisition unit 211. That is, the communication management unit 212 refers to the related information acquired by the acquisition unit 211, and detects an event that has occurred in the at least one communication apparatus 100 among the plurality of communication apparatuses 100 or in connection in which the at least one communication apparatus 100 is involved.

Examples of the event detected by the communication management unit 212 include the following:

- a deterioration in line quality;
- line disconnection;
- detection of scanning by a new communication apparatus 100; and
- establishment of a new connection.

In accordance with a monitoring result, the communication management unit 212 instructs each of the communication apparatuses 100 to carry out, for example, the following processes:

- scanning with use of a communication apparatus 100;
- establishment of connection with use of the communication apparatus 100;
- disconnection with use of the communication apparatus 100;
- switching of connection with use of the communication apparatus 100; and
- updating of the communication path.

For example, the communication management unit 212 that has detected a deterioration in line quality may update the communication path so as to bypass a deteriorated line. Alternatively, the communication management unit 212 that has detected line disconnection may instruct the communication apparatus 100 to carry out scanning for reconnection and establish connection.

As another example, the communication management unit 212 that has detected scanning by the new communication apparatus 100 and establishment of a new connection may instruct the communication apparatus 100 on, for example, updating of the communication path, disconnection, and switching of connection so as to optimize the meshed network including the new communication apparatus 100.

(Storage Management Unit 213)

The storage management unit 213 manages a process of storage in the storage unit 230. The storage management unit 213 stores, in the storage unit 230, the related information acquired by the acquisition unit 211. The storage management unit 213 also reads various kinds of information stored in the storage unit 230, and provides the information to each unit of the control unit 210.

The storage management unit 213 not only accumulates the acquired related information but also stores, in the storage unit 230, reference information (described later) and correlation information (described later).

(Instruction Unit 214)

The instruction unit 214 generates, in accordance with a result of the processes carried out by the communication management unit 212, instruction information for controlling the communication apparatuses 100-0 to 100-8.

(Storage Unit 230)

The storage unit 230 stores the related information acquired by the acquisition unit 211.

The storage unit 230 further stores the reference information.

The storage unit 230 further stores the correlation information. The correlation information is information indicative of correlation between the reference information (described earlier) and related information pertaining to each of the communication apparatuses 100, in particular, for example, a line quality and/or the number of times of disconnection within a specified time for each of the communication apparatuses 100.

(Communication Unit 240)

The communication unit 240 is configured to carry out communication with use of a communication medium different from the directional communication medium used by first communication units 110 (FIG. 6) of each of the communication apparatuses for communication with each other. The communication unit 240 communicates with the second communication unit 120 (FIG. 6) of each of the communication apparatuses. Examples of a form of communication by the communication unit 240 include communication via, for example, a wired or wireless local area network, or a global network.

Example Process Carried Out by Control Apparatus

The following description discusses specific example processes related to the communication system 1 and carried out by the control apparatus 200 (a flow of a control method).

Example Process 1 Carried Out by Control Apparatus

For example, the control unit 210 may monitor at least one communication apparatus 100 among the plurality of communication apparatuses 100 with reference to the related information acquired by the acquisition unit 211, and control line connection in accordance with a monitoring result.

Figure 12:
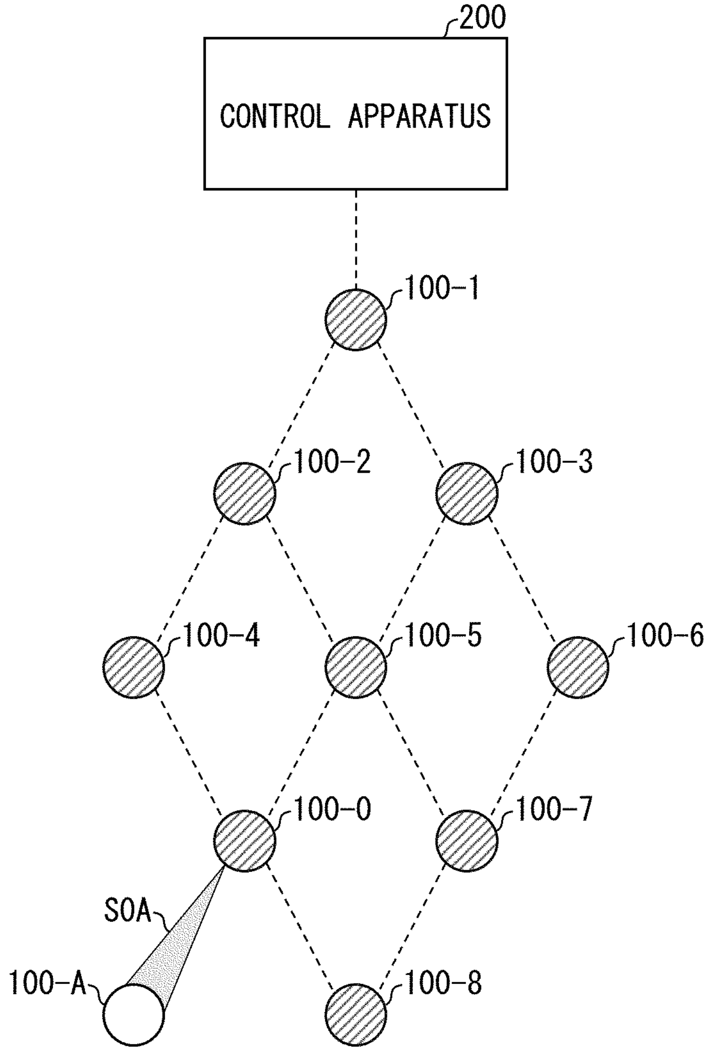
FIG. 12 is a diagram for describing an example of a state in which a new terminal is to connect to a meshed network in the third example embodiment of the present invention.

FIG. 12 is a diagram for describing an example of a state in which a new terminal is to connect to a meshed network controlled by the control apparatus 200.

In the example illustrated in FIG. 12, a communication apparatus 100-A is to connect to a meshed network constituted by the communication apparatuses 100-0 to 100-8.

In this case, the communication management unit 212 may give priority to at least one connection destination candidate with reference to related information related to the at least one connection destination candidate, the at least one connection destination candidate having been specified by the communication management unit 132 of the new terminal (communication apparatus 100-A), and control connection by the communication management unit 132 of the communication apparatus 100-A.

For example, the communication management unit 212 simulates connection so as to add the new terminal (communication apparatus 100-A) to the meshed network. As an example of simulation, the communication management unit 212 may reduce priority of a route with a poor line quality with reference to the line quality of connection among the pieces of related information. The communication management unit 212 gives the communication apparatus 100-A an instruction to carry out connection with high priority (e.g., connection with the communication apparatus 100-0). The instruction may be included in scanning information that is transmitted from the communication apparatus 100-0 to the communication apparatus 100-A. This enables establishment of connection with the new terminal by a route with a good line quality, so that smooth connection can be achieved.

As another example of simulation, in accordance with a time, the communication management unit 212 may set priority for connection that is susceptible to influence of sunlight depending on time. This enables establishment of connection with the new terminal (communication apparatus) by selection of a line suitable for connection, so that smooth connection can be achieved.

Figure 13:
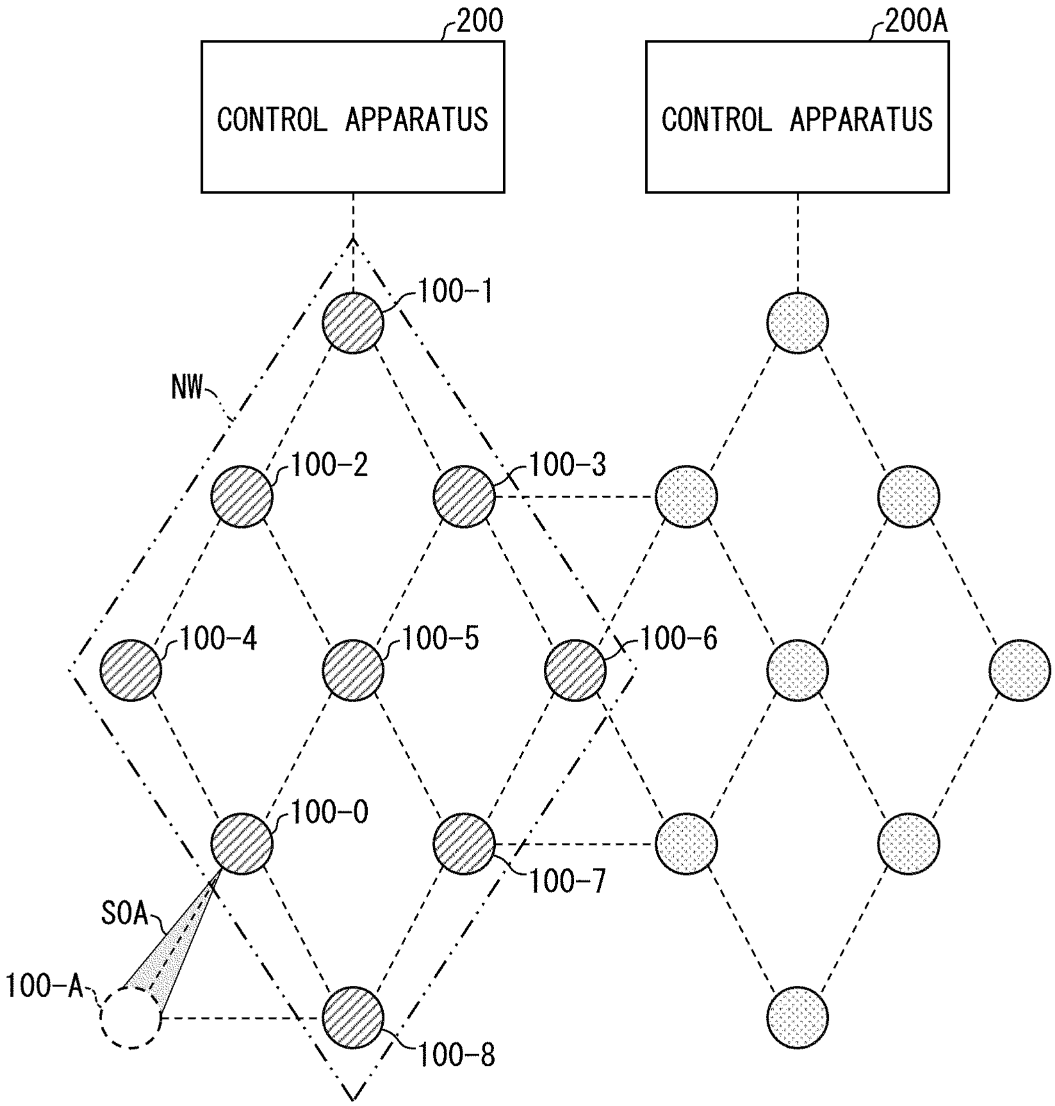
FIG. 13 is a diagram for describing an example of the state in which the new terminal is to connect to the meshed network in the third example embodiment of the present invention.

FIG. 13 is a diagram for describing an example of the state in which the new terminal is to connect to the meshed network controlled by the control apparatus 200.

In the example illustrated in FIG. 13, another network controlled by a control apparatus 200A is connected to the meshed network constituted by the communication apparatuses 100-0 to 100-8. The communication apparatus 100-A is to connect to the meshed network constituted by the communication apparatuses 100-0 to 100-8. Note that the another network is exemplified by but not particularly limited to an existing optical fiber network or the like.

In the example illustrated in FIG. 13, the communication apparatuses 100-3, 100-6, and 100-7 are each a boundary terminal present at a boundary with the another network (a B network). The communication management unit 212 may intensively monitor such a boundary terminal. This is because a communication apparatus that carries out boundary connection is highly likely to be subjected to a higher traffic load.

For example, the communication management unit 212 simulates an increase in load on the boundary terminal so as to add the new terminal (communication apparatus 100-A) to the meshed network. For example, the communication management unit 212 estimates an increase in traffic with the another network due to addition of the communication apparatus 100-A, and estimates an increase in load on the boundary terminal due to the increase in traffic. The communication management unit 212 may determine, in accordance with the increase in load on the boundary terminal, necessity to add the boundary terminal to be connected to the another network, and/or a change in connection path, and instruct each of the communication apparatuses 100 on the necessity and/or change.

Example Process 2 Carried Out by Control Apparatus

For example, the control unit 210 may acquire a connection request from a new terminal that is to newly connect to the meshed network, and control connection of the new terminal.

Figure 14:
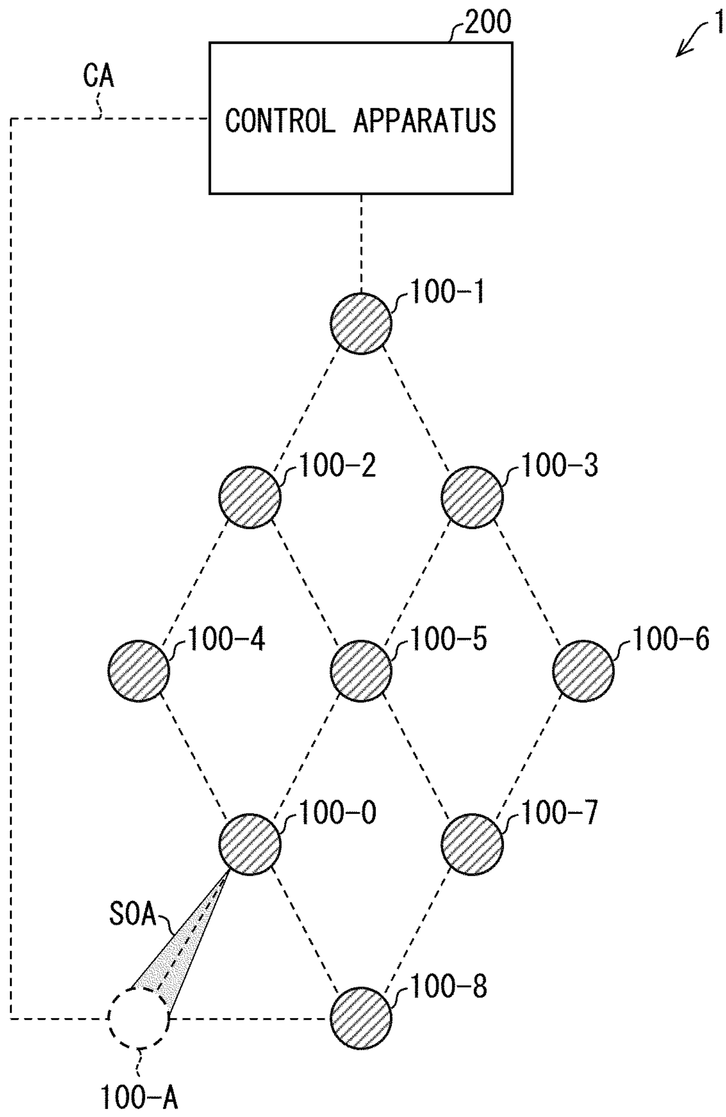
FIG. 14 is a diagram for describing an example of the state in which the new terminal is to connect to the meshed network in the third example embodiment of the present invention.

FIG. 14 is a diagram for describing an example of the state in which the new terminal is to connect to the meshed network controlled by the control apparatus 200.

The new terminal 100-A that is to newly connect to the meshed network uses an existing line CA different from the meshed network to notify the control apparatus 200 of the connection request including terminal coordinates of the new terminal 100-A. Thus, the acquisition unit 211 of the control apparatus 200 acquires the connection request including the terminal coordinates.

Next, the communication management unit 212 specifies, in accordance with, for example, the related information stored in the storage unit 230, at least one communication apparatus 100 (e.g., the communication apparatus 100-0) that is in the meshed network and that is to be connected to the new terminal. For example, the communication management unit 212 specifies, in accordance with, for example, the related information, the communication apparatus 100-0 that is located near the new terminal 100-A.

Subsequently, the instruction unit 214 instructs the specified communication apparatus 100 (e.g., the communication apparatus 100-0) on connection. For example, the instruction unit 214 instructs the specified communication apparatus 100 on connection including the terminal coordinates of the new terminal 100-A.

Then, the communication apparatus 100 that has been instructed on the connection request transmits a scanning beam S0A in a direction of the new terminal with reference to the terminal coordinates of the new terminal 100-A.

Next, the new terminal 100-A receives the scanning beam S0A, returns a response beam, and establishes connection with the communication apparatus 100.

Effect Brought about by Example Process 2

According to the communication system of the third example embodiment, in order to add a new terminal to a meshed network, it is possible to notify the control apparatus 200 of terminal coordinates of the new terminal, and transmit a scanning beam in a direction of the new terminal. This makes it possible to narrow down a search range of scanning and complete search in a short time.

Example Process 3 Carried Out by Control Apparatus

For example, the control unit 210 acquires a request from the communication apparatus 100 that has received a scanning signal from a new terminal which is to newly connect to the meshed network, and updates a communication path.

Figure 15:
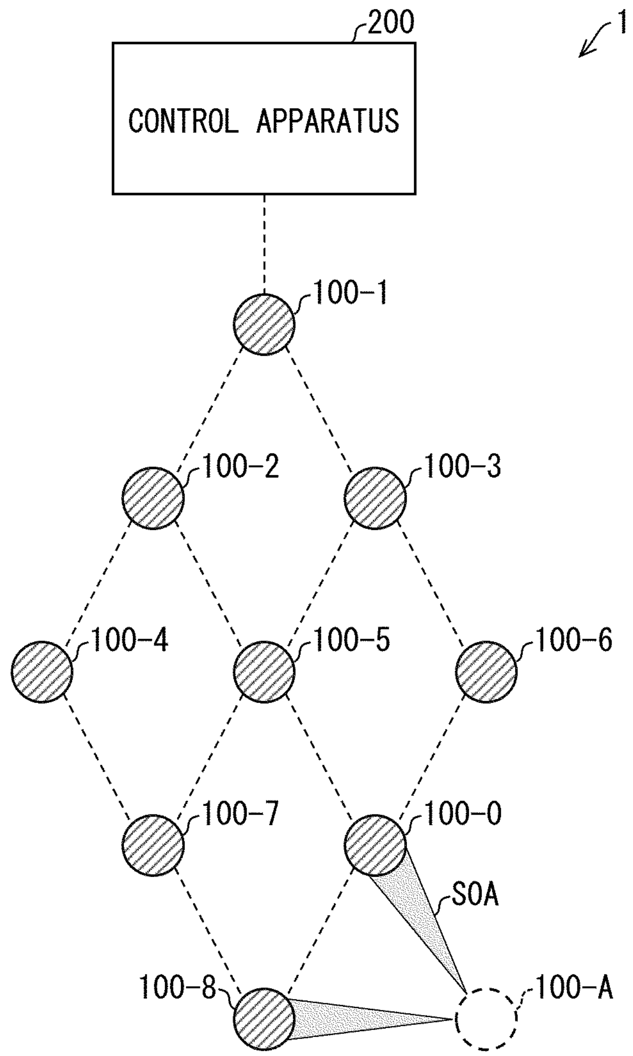
FIG. 15 is a diagram for describing an example of the state in which the new terminal is to connect to the meshed network in the third example embodiment of the present invention.

FIG. 15 is a diagram for describing an example of the state in which the new terminal is to connect to the meshed network controlled by the control apparatus 200.

The new terminal (communication apparatus 100-A) that is to newly connect to the meshed network transmits scanning beams S0A in a predetermined range.

The communication apparatuses 100 (communication apparatuses 100-0 and 100-8) that have received the respective scanning beams S0A transmit communication apparatus request information to the control apparatus 200. Thus, the acquisition unit 211 acquires request information.

Subsequently, the communication management unit 212 updates, in accordance with the request information, at least one communication path included in the meshed network. For example, by acquiring, from the new terminal 100-A, the related information pertaining to the new terminal 100-A, and referring to the related information together with the related information stored in the storage unit 230, the communication management unit 212 updates at least one communication path so as to optimize at least one communication path, the at least one communication path being included in a meshed network formed by a group of communication apparatuses used for data transmission of the communication apparatus 100-A, which is the new terminal. Optimization of a communication path means the following: In a meshed network, in a case where each communication apparatus holds choices of a plurality of communication paths, even when all communication apparatuses are connectable and disconnection due to a failure or the like occurs, a communication path is formed by robust management and switching so as to enable data transmission of a user connecting to an access network.

Effect Brought about by Example Process 3

According to the communication system of the third example embodiment, in order to add a new terminal to a meshed network, it is possible to notify the control apparatus 200 of terminal coordinates of the new terminal and achieve optimum routing formation.

Example Process 4 Carried Out by Control Apparatus

For example, the control unit 210 may manage, for each of the at least one communication apparatus 100 included in the meshed network, the number of connections that are capable of being established and the number of established connections.

Figure 16:
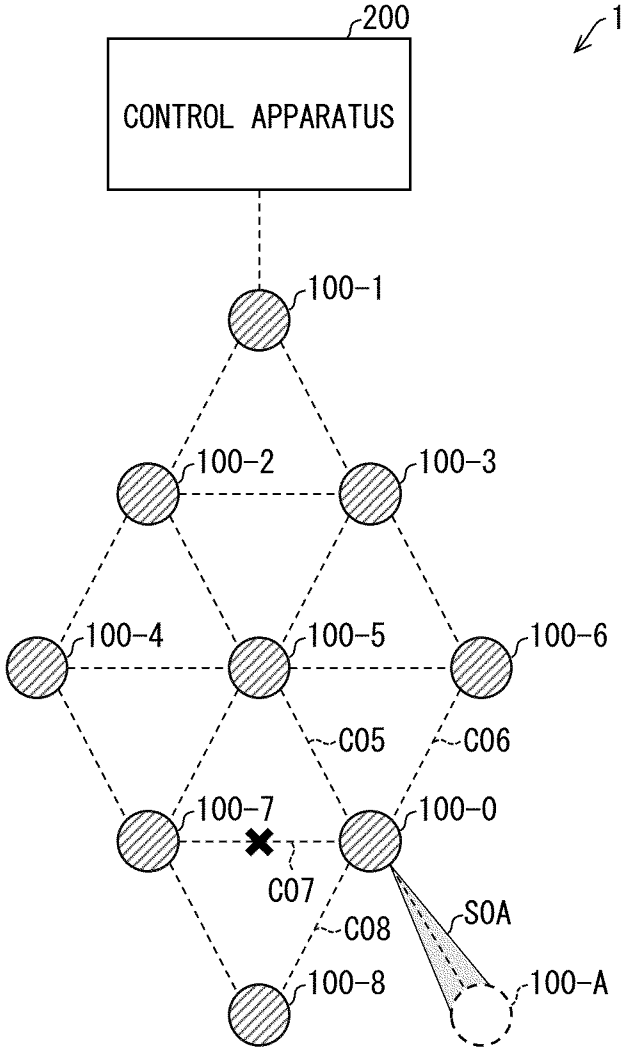
FIG. 16 is a diagram for describing an example of the state in which the new terminal is to connect to the meshed network in the third example embodiment of the present invention.

FIG. 16 is a diagram for describing an example of the state in which the new terminal is to connect to the meshed network controlled by the control apparatus 200.

The communication management unit 212 manages, for each of the at least one communication apparatus included in the meshed network, the following:

the number of connections that are capable of being established; and the number of established connections.

The number of connections that are capable of being established is a total number (maximum number) of (i) the number of lines in which communication is not established but is capable of being established and (ii) the number of lines in which communication is established. The number of connections that are capable of being established is also the number of connection destination candidates specified by the communication management unit 132 of the communication apparatus 100. The number of established connections is the number of lines in which communication is established.

In the third example embodiment, in order that the number of established connections is not more than a value obtained by subtracting 1 from the maximum number of connections that are capable of being established, the communication management unit 212 updates, for each of the at least one communication apparatus included in the meshed network, at least one communication path included in the meshed network. For example, in a case where in each of the communication apparatuses 100, all the connections that are capable of being established are established and used as communication paths, by updating at least one communication path so as to prevent the at least one communication path from passing through a corresponding communication apparatus 100, the communication management unit 212 controls the meshed network so that the number of established connections is not more than a value obtained by subtracting 1 from the maximum number of connections that are capable of being established.

For example, the communication management unit 212 gives priority to at least one communication path with reference to related information related to a communication apparatus which is involved in the at least one communication path, the at least one communication path being included in the meshed network. The priority is relatively given in accordance with, for example, strength of connection, and presence or absence and the number of alternative communication paths. Information pertaining to the priority that is associated with each of the at least one communication path is stored, as the reference information, in the storage unit 230.

For example, in order to update the at least one communication path, the communication management unit 212 may carry out routing with use of a communication path with high priority so that the number of established connections is not more than a value obtained by subtracting 1 from the maximum number of connections that are capable of being established.

With this, in a state in which the meshed network is maintained, a free line in the meshed network can be used to transmit a scanning beam to the new terminal 100-A that is to newly connect to the meshed network (see FIG. 16).

Furthermore, for example, in a case where the new terminal 100-A is to connect to the meshed network and the number of established connections of the communication apparatus 100 to which the new terminal 100-A is to connect is the maximum number of connections that are capable of being established, the communication management unit 212 may carry out a process for disconnecting a communication path with relatively low priority among the at least one communication path included in the meshed network. This enables the number of established connections to be not more than a value obtained by subtracting 1 from the maximum number of connections that are capable of being established. The communication management unit 212 gives, via the instruction unit 214 to the communication apparatus constituting a communication path to be disconnected, an instruction to disconnect the communication path with relatively low priority.

In a case where a description is given with reference to FIG. 16, the communication management unit 212 specifies, for, for example, the communication apparatus 100, the following:

that the number (maximum number) of connections that are capable of being established is "4"; and that the number of established connections is "4" (circuits C07, C05, C06, and C08, which are connections established with the communication apparatuses 100-7, 100-5, 100-6, and 100-8).

After such specification, the communication management unit 212 refers to the reference information of the storage unit 230, compares respective degrees of priority of the lines C07, C05, C06, and C08, and specifies a line that is the communication path with relatively low priority. In FIG. 16, it is specified that the line C07 is the communication path with relatively low priority.

Subsequently, the communication management unit 212 gives, via the instruction unit 214 to the communication apparatus 100-0 constituting the line C07, an instruction to disconnect the line C07.

Due to such disconnection, in the communication apparatus 100-0, the number (maximum number) of connections that are capable of being established is "4"; and the number of established connections is "3".

This results in occurrence of one ("1") connection that is capable of being established but is not established. Such a connection line means a so-called free line.

By thus generating a free line, the free line is used to transmit the scanning beam to the new terminal 100-A that is to newly connect to the meshed network (see FIG. 16).

With this, at least one free line is provided in established connection lines of each of the communication apparatuses. Thus, even in a case where connection is lost, a free line can be newly used to ensure connection. It is therefore possible to achieve a robust meshed network.

Furthermore, for example, in a case where the new terminal 100-A is to connect to the meshed network and the number of established connections of the communication apparatus 100 to which the new terminal 100-A is to connect is the maximum number of connections that are capable of being established, the communication management unit 212 may notify, for example, a manager of the meshed network that a further new terminal (relay terminal) is to be added to increase the maximum number of connections that are capable of being established by the at least one communication apparatus 100 included in the meshed network. For example, the communication management unit 212 may simulate at which location to additionally dispose the relay terminal, and notify, for example, a manager of the meshed network of a simulation result.

This allows each of the communication apparatuses 100 to carry out scanning, so that the maximum number of connections that are capable of being established can be increased. This enables the number of established connections to be not more than a value obtained by subtracting 1 from the maximum number of connections that are capable of being established.

Assume that the communication management unit 212 manages, for example, the communication apparatus 100-0 so that:

the number (maximum number) of connections that are capable of being established is "3"; and the number of established connections is "3".

In this case, the communication management unit 212 instructs the communication apparatus 100-0 to carry out scanning again. This causes the communication apparatus 100-0 to have one ("1") connection line that is capable of being established but is not established. The communication management unit 212 instructs the communication apparatus 100-0 to use the one ("1") connection to establish connection with the new communication apparatus 100-A.

This enables reconnection even in a case where an established connection has been lost due to, for example, a failure, so that a robust meshed network can be formed.

Example Process 5 Carried Out by Control Apparatus

For example, in a case where at least one connection included in established connections has been broken, the control unit 210 may instruct at least one communication apparatus 100 involved in the at least one broken connection to reestablish the at least one broken connection.

Figure 17:
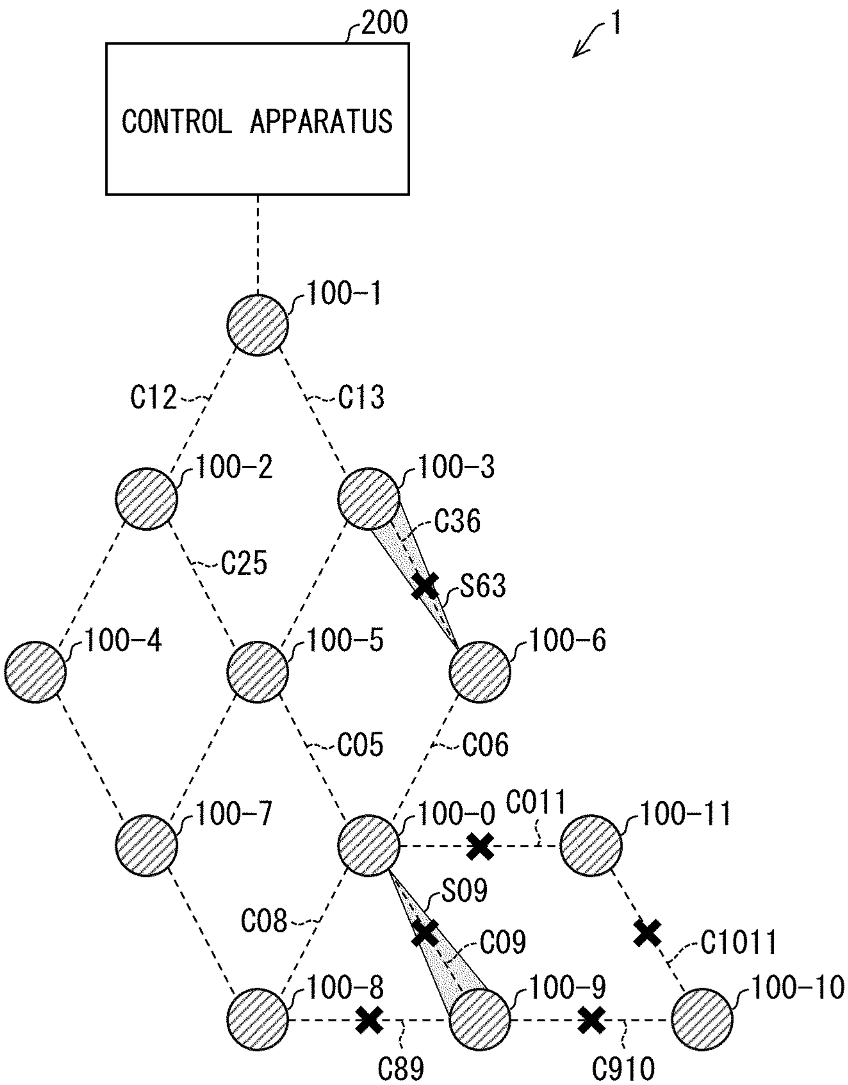
FIG. 17 is a diagram for describing an example of a state in which line disconnection has occurred to the meshed network in the third example embodiment of the present invention.

FIG. 17 is a diagram for describing an example of a state in which line disconnection has occurred to the meshed network controlled by the control apparatus 200.

For example, the communication management unit 212 manages, for each of the communication apparatuses forming the meshed network, the following:

the number of established connections.

Since the communication management unit 212 manages the number of established connections, it is possible to also manage whether at least one connection included in the established connections has been broken. Thus, in a case where the at least one connection included in the established connections has been broken, the communication management unit 212 gives, to at least one communication apparatus involved in the at least one broken connection, an instruction to reestablish the at least one broken connection. The instruction given to the at least one communication apparatus is carried out by the instruction unit 214.

The communication management unit 212 thus instructs at least one communication apparatus involved in a broken connection to reestablish the broken connection. Thus, the communication management unit 212 manages communication paths so that each of the communication apparatuses is connectable by two or more communication paths without fail.

For example, the communication management unit 212 manages the communication paths such that the communication apparatus 100-6 is connected by a first system consisting of circuits C13 and C36 and a second system consisting of circuits C12, C25, C05, and C06.

In this state, the communication management unit 212 which specifies that the circuit C36 has been disconnected attempts reconnection of the circuit C36 by using the second system to instruct the communication apparatus 100-6 to transmit a scanning beam S63. In order to instruct the communication apparatus 100-6 to transmit the scanning beam S63, the communication management unit 212 transmits, to the communication apparatus 100-6, terminal coordinate information of the communication apparatus 100-3. As described above, specification of the terminal coordinate information of the communication apparatus enables reconnection even in a case where connection is lost.

Furthermore, there is not only a case where only one connection is broken, but also a case where a plurality of connections in a certain range are broken. Also in this case, the communication management unit 212 can give an instruction for reconnection.

In FIG. 17, the communication management unit 212 which specifies that circuits C06, C89, C910, C011, and C1011 have been disconnected refers to the related information and calculates a communication path that is connectable.

In accordance with a calculation result, the communication management unit 212 transmits a connection instruction via the instruction unit 214 to the communication apparatus (e.g., the communication apparatus 100-0) in which a communication path is secured.

Upon receiving the connection instruction, the communication apparatus 100-0 transmits a scanning beam S09 to a communication apparatus 100-9 and attempts to connect to the communication apparatus 100-9. The communication management unit 212 manages terminal coordinates of each of the communication apparatuses. Thus, even in a case where disconnection occurs, it is possible to transmit a scanning beam toward a communication apparatus serving as a reconnection target.

During transmission of the scanning beam S09 from the communication apparatus 100-0 to the communication apparatus 100-9, a scanning beam may also be transmitted from the communication apparatus 100-0 to a communication apparatus 100-11.

In a case where reconnection with the communication apparatus 100-9 is enabled, a scanning beam is transmitted from the communication apparatus 100-9 to a communication apparatus 100-10 so that reconnection of the circuit C910 is carried out.

As described above, the control apparatus of the third example embodiment makes it possible to carry out reconnection with respect to at least one communication apparatus that is involved in a broken connection. This enables achievement of a robust meshed network.

Example Process 6 Carried Out by Control Apparatus

For example, the control unit 210 may (i) acquire, from the at least one communication apparatus included in the meshed network, not only related information related to the at least one communication apparatus but also reference information different from the related information, (ii) calculate correlation between the related information and the reference information, and (iii) accumulate correlation information indicative of the calculated correlation.

For example, the acquisition unit 211 of the control unit 210 acquires the related information. That is, the acquisition unit 211 is an example implementation of the acquisition means.

The related information acquired by the acquisition unit 211 may include at least one selected from the group consisting of the following:

- a line quality of connection in which the at least one communication apparatus is involved; and
- the number of times of disconnection in the connection in which the at least one communication apparatus is involved.

The acquisition unit 211 of the control unit 210 also acquires the reference information different from the related information.

The reference information acquired by the acquisition unit 211 may include at least one selected from the group consisting of the following:

- weather information; and
- sensor information acquired by at least one external sensor 300.

The weather information is acquired by the acquisition unit 211 via a communication means different from the meshed network. The sensor 300 may be commonly a field sensor that senses an environment. For example, the field sensor may be configured to sense, for example, the amount of sunlight, atmospheric pressure, and/or temperature. The sensor 300 transmits the sensor information to the control apparatus 200 via the meshed network.

Furthermore, for example, the storage management unit 213 of the control unit 210 calculates the correlation between the related information and the reference information. That is, the storage management unit 213 is an example implementation of the accumulation means. The storage management unit 213 stores the correlation information in the storage unit 230.

A method in which the storage management unit 213 calculates the correlation between the related information and the reference information is not particularly limited. For example, the storage management unit 213 can be configured to use algorithms such as a regression analysis, a support vector machine, and a principal component analysis to calculate the correlation between the related information and the reference information.

By referring to the reference information acquired by the acquisition unit 211 and the correlation information accumulated by the storage management unit 213, the communication management unit 212 can predict various kinds of related information and update (change) a communication path in accordance with a prediction result. The communication management unit 212 may predict, for example, temporal regularity of the related information.

For example, with reference to the related information, which is at least one selected from the group consisting of:

- a line quality of connection in which each of the communication apparatuses 100 is involved; and
- the number of times of disconnection in the connection in which each of the communication apparatuses 100 is involved, and the correlation information, which indicates the correlation between the related information and the reference information, the communication management unit 212 may predict the related information and update (change) the communication path so as not to include any communication apparatus 100 or connection in which a deterioration in line quality or an increase in number of times of disconnection is predicted. In addition, the communication management unit 212 may update (change) the communication path in accordance with a result of prediction of the related information such as a load state of each of the communication apparatuses 10. That is, the communication management unit 212 is an example implementation of an updating means.

For example, the communication management unit 212 predicts a deterioration in line quality or line disconnection with reference to the correlation information. That is, the communication management unit 212 is an example implementation of a prediction means.

Figure 18:
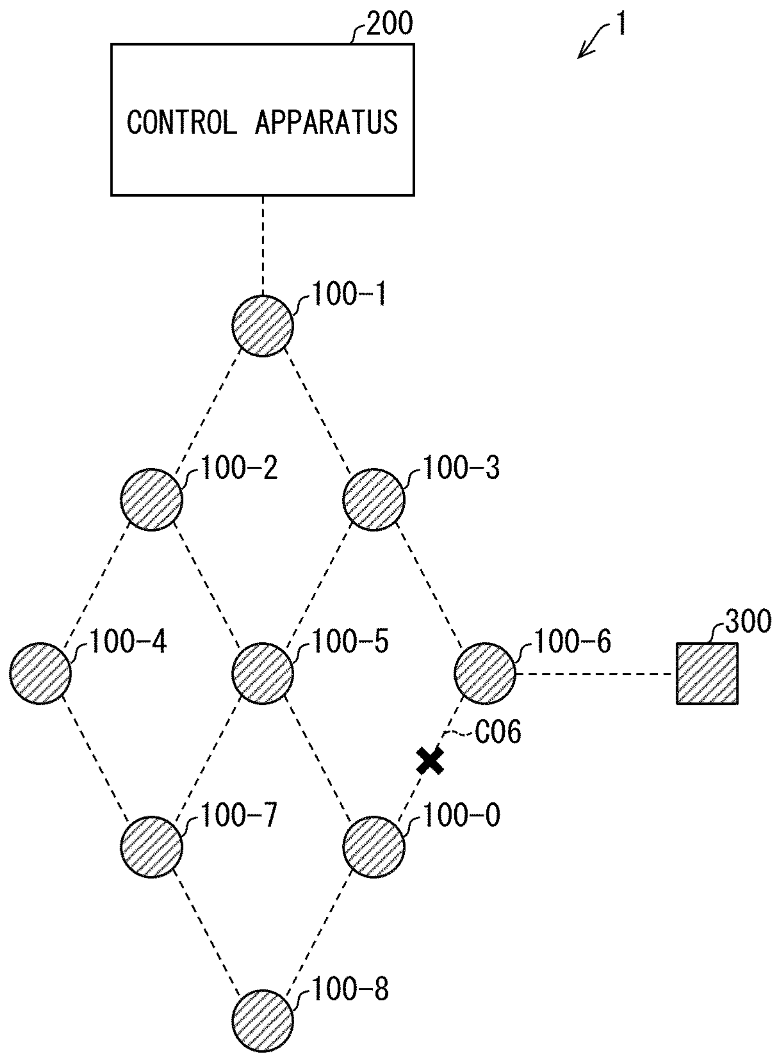
FIG. 18 is a diagram for describing an example of the state in which line disconnection has occurred to the meshed network in the third example embodiment of the present invention.

For example, the communication management unit 212 predicts a deterioration in line quality or line disconnection with reference to the correlation information for, for example, the communication apparatus 100-0. For example, a risk degree (a higher risk degree indicates a higher risk of disconnection) is given in accordance with a result of prediction. For example, in FIG. 18, regarding a plurality of lines C05, C06, and C08 established with the communication apparatus 100-0, for example, in a case where a sunlight emission direction and a direction of a communication medium are parallel, a risk of communication disconnection is high. In a case where a risk degree is configured in accordance with this, it is predicted that the line C06 between the communication apparatus 100-0 and the communication apparatus 100-6 will have the highest risk degree. It is predicted that the line C08 between the communication apparatus 100-0 and the communication apparatus 100-8 will have the second highest risk degree and that the line C05 between the communication apparatus 100-0 and the communication apparatus 100-5 will have the lowest risk degree. The communication management unit 212 updates (changes) the communication path in accordance with the above prediction result in order to prioritize a communication path that uses the circuit C05.

Furthermore, in the third example embodiment, for example, the communication management unit 212 refers to the prediction result, updates at least one communication path included in the meshed network, and manages, for each of the at least one communication apparatus included in the meshed network, the following:

- the number of established connections.

For example, the instruction unit 214 instructs at least one communication apparatus involved in a broken connection to reestablish the broken connection. In this case, the instruction unit 214 instructs the at least one communication apparatus to reestablish the broken connection with reference to at least one selected from the group consisting of the following:

- the reference information;
- the correlation information; and
- the prediction result.

That is, the communication management unit 212 and the instruction unit 214 are an example implementation of a management means and an instruction means, respectively.

Furthermore, for example, the communication management unit 212 refers to the correlation information and considers a timing of reconnection of a disconnected communication path. The timing is a timing of transmission of a scanning beam.

Effect Brought about by Example Process 6

According to the communication system of the third example embodiment, a communication path to be connected with priority is set. This makes it possible to improve persistence of communication and achieve a robust meshed network.

Software Implementation Example

Some or all of the functions of each of the communication apparatuses 10, 10-1 to 10-4, 100, 100-0 to 100-11, and 100-A may be realized by hardware such as an integrated circuit (IC chip) or may be alternatively realized by software.

Figure 19:
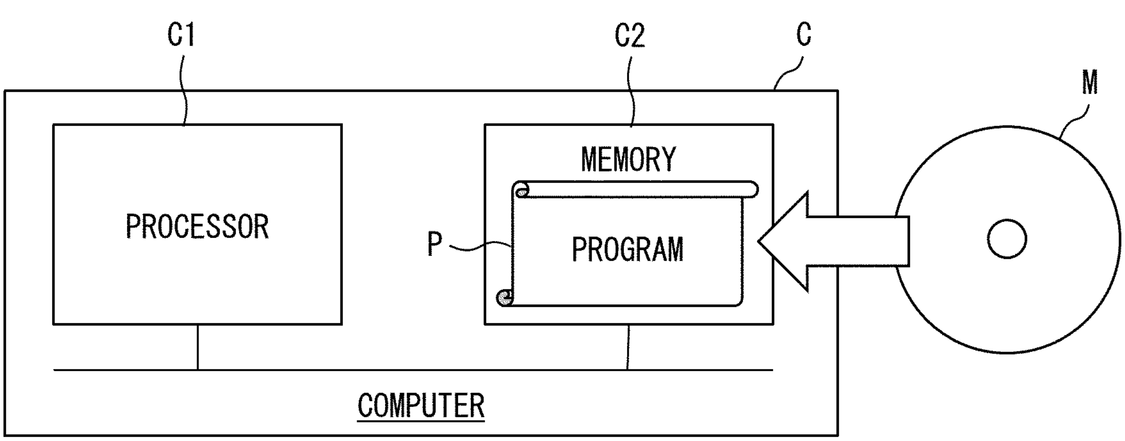
FIG. 19 is a block diagram illustrating a computer hardware configuration, which is an example implementation of the communication apparatus according to each of the example embodiments of the present invention.

In the latter case, the communication apparatuses 10, 10-1 to 10-4, 100, 100-0 to 100-8, and 100-A are each realized by, for example, a computer that executes instructions of a program that is software realizing the functions. FIG. 19 illustrates an example of such a computer (hereinafter, referred to as "computer C"). The computer C includes at least one processor C1 and at least one memory C2. The memory C2 stores a program P for causing the computer C to operate as each of the communication apparatuses 10, 10-1 to 10-4, 100, 100-0 to 100-8, and 100-A. In the computer C, the functions of each of the communication apparatuses 10, 10-1 to 10-4, 100, 100-0 to 100-8, and 100-A are realized by the processor C1 reading the program P from the memory C2 and executing the program P.

The processor C1 may be, for example, a central processing unit (CPU), a graphic processing unit (GPU), a digital signal processor (DSP), a micro processing unit (MPU), a floating point number processing unit (FPU), a physics processing unit (PPU), a microcontroller, or a combination thereof. The memory C2 may be, for example, a flash memory, a hard disk drive (HDD), a solid state drive (SSD), or a combination thereof.

Note that the computer C may further include a random access memory (RAM) in which the program P is loaded when executed and/or in which various kinds of data are temporarily stored. The computer C may further include a communication interface for transmitting and receiving data to and from another apparatus. The computer C may further include an input/output interface for connecting the computer C to an input/output apparatus(es) such as a keyboard, a mouse, a display, and/or a printer.

The program P can also be recorded in a non-transitory tangible storage medium M from which the computer C can read the program P. Such a storage medium M may be, for example, a tape, a disk, a card, a semiconductor memory, a programmable logic circuit, or the like. The computer C can acquire the program P via the storage medium M. The program P can also be transmitted via a transmission medium. The transmission medium may be, for example, a communication network, a broadcast wave, or the like. The computer C can acquire the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can also be described as below. Note, however, that the present invention is not limited to the following example aspects.

(Supplementary Note 1)

A communication system including a plurality of communication apparatuses that are capable of configuring a meshed network, and a control apparatus that controls the plurality of communication apparatuses, the plurality of communication apparatuses each including:

at least one communication means that is configured to be capable of transmitting and receiving directional communication media;

a specification means that specifies at least one connection destination candidate by carrying out scanning with use of the at least one communication means; and a connection establishment means that establishes connection with the at least one connection destination candidate specified by the specification means, the control apparatus including a control means that controls the plurality of communication apparatuses, the control means including:

an acquisition means that acquires, from at least one communication apparatus included in the meshed network, not only related information related to the at least one communication apparatus but also reference information different from the related information; and an accumulation means that calculates correlation between the related information and the reference information, and accumulates correlation information indicative of the calculated correlation.

The above configuration makes it possible to achieve a robust communication network in which a directional communication medium is used.

(Supplementary Note 2)

The communication system according to Supplementary note 1, wherein the related information includes at least one selected from the group consisting of:

a line quality of connection in which the at least one communication apparatus is involved; and the number of times of disconnection in the connection in which the at least one communication apparatus is involved, and the reference information includes at least one selected from the group consisting of:

weather information; and sensor information acquired by at least one sensor included in the meshed network.

According to the above configuration, the control means can control a communication network in accordance with correlation between the connection of the at least one communication apparatus and the reference information so as to form optimum routing.

(Supplementary Note 3)

The communication system according to Supplementary note 2, wherein the control means includes a prediction means that predicts a deterioration in line quality or line disconnection with reference to the correlation information accumulated by the accumulation means.

According to the above configuration, the control means can control a communication network so as to form optimum routing.

(Supplementary Note 4)

The communication system according to Supplementary note 3, wherein the control means includes an updating means that updates, with reference to a result of prediction by the prediction means, at least one communication path included in the meshed network.

According to the above configuration, the control means can control a communication network so as to form optimum routing.

(Supplementary Note 5)

The communication system according to Supplementary note 4, wherein the control means includes:

a management means that manages the number of established connections for each of the at least one communication apparatus included in the meshed network; and an instruction means that instructs, in a case where at least one connection included in the established connections has been broken, the at least one communication apparatus involved in the at least one broken connection to reestablish the at least one broken connection, the instruction means instructing, with reference to at least one selected from the group consisting of the reference information, the correlation information, and the result of prediction by the prediction means, the at least one communication apparatus involved in the at least one broken connection to reestablish the at least one broken connection.

According to the above configuration, the control means can control a communication network so as to form optimum routing.

(Supplementary Note 6)

A control apparatus including a control means that controls a plurality of communication apparatuses that are capable of configuring a meshed network, the plurality of communication apparatuses each including:

at least one communication means that is configured to be capable of transmitting and receiving directional communication media;

a specification means that specifies at least one connection destination candidate by carrying out scanning with use of the at least one communication means; and a connection establishment means that establishes connection with the at least one connection destination candidate specified by the specification means, the control means including:

an acquisition means that acquires, from at least one communication apparatus included in the meshed network, not only related information related to the at least one communication apparatus but also reference information different from the related information; and an accumulation means that calculates correlation between the related information and the reference information, and accumulates correlation information indicative of the calculated correlation.

The above configuration makes it possible to achieve a robust communication network in which a directional communication medium is used.

(Supplementary Note 7)

A method for controlling a communication system, the communication system including a plurality of communication apparatuses that are capable of configuring a meshed network, and a control apparatus that controls the plurality of communication apparatuses, the method including:

the plurality of communication apparatuses each (i) specifying at least one connection destination candidate by carrying out scanning with use of at least one communication means that is configured to be capable of transmitting and receiving directional communication media, and (ii) establishing connection with the at least one connection destination candidate thus specified; and the control apparatus controlling the plurality of communication apparatuses, wherein the control apparatus controlling the plurality of communication apparatuses includes the control apparatus (a) acquiring, from at least one communication apparatus included in the meshed network, not only related information related to the at least one communication apparatus but also reference information different from the related information, and (b) calculating correlation between the related information and the reference information, and accumulating correlation information indicative of the calculated correlation.

The above configuration makes it possible to achieve a robust communication network in which a directional communication medium is used.

[Additional Remark 3]

This application claims priority on Patent Application No. 2021-061077 filed in Japan on Mar. 31, 2021, the entire contents of which are hereby incorporated by reference.

REFERENCE SIGNS LIST

1 Communication system
10, 10-1-10-4 Communication apparatus
11 Communication unit (communication means)
12 Specification unit (specification means)
13 Connection establishment unit (connection establishment means)
20 Control apparatus
21 Control unit (control means)
22 Acquisition unit (acquisition means)
23 Accumulation unit (accumulation means)
100-0-100-11, 100-A Communication apparatus
131 Acquisition unit
132 Communication management unit (specification means, connection establishment means)
133 Storage management unit
150 Storage unit
110-1, 110-2 First communication unit (communication means)
120 Second communication unit
200 Control apparatus
210 Control unit (control means)
211 Acquisition unit (acquisition means, related information acquisition means, connection request acquisition means, request acquisition means)

212 Communication management unit (storage means, updating means, prediction means)

213 Storage management unit (storage means, accumulation means)

214 instruction unit

230 Storage unit

What is claimed is:

1. A communication system comprising a plurality of communication apparatuses that are capable of configuring a meshed network, and a control apparatus that is configured to control the plurality of communication apparatuses, wherein each communication apparatus of the plurality of communication apparatuses comprises:

communication circuitry configured to be capable of transmitting and receiving directional communication media;

a first memory storing first instructions; and at least one first processor configured to execute the first instructions to:

specify at least one connection destination candidate by carrying out scanning with use of the communication circuitry; and establish connection with the at least one connection destination candidate, the control apparatus comprising:

a second memory storing second instructions; and at least one second processor configured to execute the second instructions to:

control the plurality of communication apparatuses, wherein controlling the plurality of communication apparatuses comprises to:

acquire, from at least one communication apparatus included in the meshed network, related information related to the at least one communication apparatus and reference information different from the related information; and calculate a correlation between the related information and the reference information, and accumulate correlation information indicative of the calculated correlation, wherein the related information comprises at least one of:

a line quality of a connection in which the at least one communication apparatus is involved; and a number of times of disconnection in the connection in which the at least one communication apparatus is involved, and the reference information comprises weather information.

2. The communication system according to claim 1, wherein controlling the plurality of communication apparatuses comprises to:

predict a deterioration in line quality or line disconnection based on the correlation information.

3. The communication system according to claim 2, wherein controlling the plurality of communication apparatuses comprises to:

update, based on the predicted determination, at least one communication path included in the meshed network.

4. The communication system according to claim 3, wherein controlling the plurality of communication apparatuses comprises to:

manage a number of established connections for each of the plurality of communication apparatus included in the meshed network; and instruct, in a case where at least one connection included in the established connections has been broken, at least one communication apparatus involved in the at least one broken connection to reestablish the at least one broken connection, wherein instructing the at least one communication apparatus comprises to instruct, based on at least one of the reference information, the correlation information, and the result of prediction by the prediction process, the at least one communication apparatus involved in the at least one broken connection to reestablish the at least one broken connection.

5. A control apparatus comprising:

a second memory storing second instructions; and at least one second processor configured to execute the second instructions to:

control a plurality of communication apparatuses that are capable of configuring a meshed network, wherein each communication apparatus of the plurality of communication apparatuses comprises:

communication circuitry configured to be capable of transmitting and receiving directional communication media;

a first memory storing first instructions; and at least one first processor configured to execute the first instructions to:

specify at least one connection destination candidate by carrying out scanning with use of the communication circuitry; and establish a connection with the at least one connection destination candidate, controlling the plurality of communication apparatuses comprises to:

acquire, from at least one communication apparatus included in the meshed network, related information related to the at least one communication apparatus and reference information different from the related information; and calculate a correlation between the related information and the reference information, and accumulate correlation information indicative of the calculated correlation, wherein the related information comprises at least one of:

a line quality of a connection in which the at least one communication apparatus is involved; and a number of times of disconnection in the connection in which the at least one communication apparatus is involved, and the reference information comprises weather information.

6. A method for controlling a communication system, the communication system comprising a plurality of communication apparatuses that are capable of configuring a meshed network, and a control apparatus that is configured to control the plurality of communication apparatuses, wherein the method comprises:

by each communication apparatus of the plurality of communication apparatuses (i) specifying at least one connection destination candidate by carrying out scanning with use of at least one communication unit that is configured to be capable of transmitting and receiving directional communication media, and (ii) establishing connection with the at least one connection destination candidate thus specified; and controlling, by the control apparatus, the plurality of communication apparatuses, wherein controlling the plurality of communication apparatuses comprises, by the control apparatus, (a) acquiring, from at least one communication apparatus included in the meshed network, not only related information related to the at least one communication apparatus but also reference information different from the related information, and (b) calculating correlation between the related information and the reference information, and accumulating correlation information indicative of the calculated correlation, wherein the related information comprises at least one of:

a line quality of a connection in which the at least one communication apparatus is involved; and a number of times of disconnection in the connection in which the at least one communication apparatus is involved, and the reference information comprises weather information.

* * * * *